(12) United States Patent
Jiang et al.

(10) Patent No.: US 9,101,900 B2
(45) Date of Patent: Aug. 11, 2015

(54) GASIFICATION SYSTEM AND METHOD

(75) Inventors: Weibin Jiang, Aurora, CO (US); Bruce E. McComish, Mitchell, SD (US); Bryan C. Borum, Commerce City, CO (US); Benjamin H. Carryer, Denver, CO (US); Mark D. Ibsen, Highlands Ranch, CO (US); Mark Robertson, Denver, CO (US); Eric Elrod, Arvada, CO (US); Sim Weeks, Duluth, GA (US); Harold A. Wright, Longmont, CO (US)

(73) Assignee: RES USA, LLC, Commerce City, CO (US)

( * ) Notice: Subject to any disclaimer, the term of this patent is extended or adjusted under 35 U.S.C. 154(b) by 449 days.

(21) Appl. No.: 13/555,732

(22) Filed: Jul. 23, 2012

(65) Prior Publication Data

US 2013/0028801 A1 Jan. 31, 2013

Related U.S. Application Data

(60) Provisional application No. 61/512,365, filed on Jul. 27, 2011.

(51) Int. Cl.
*C10J 3/00* (2006.01)
*C10J 3/56* (2006.01)
(Continued)

(52) U.S. Cl.
CPC ............. *B01J 19/00* (2013.01); *C10G 2/332* (2013.01); *C10J 3/485* (2013.01); *C10J 3/56* (2013.01);
(Continued)

(58) Field of Classification Search
CPC ................. C10J 3/482; C10J 2300/0993
USPC .................................................. 48/61
See application file for complete search history.

(56) References Cited

U.S. PATENT DOCUMENTS 3,853,498 A 12/1974 Bailie
3,941,820 A 3/1976 Jackson et al.
(Continued)

FOREIGN PATENT DOCUMENTS

EP 0142364 5/1985
EP 153780 9/1985
(Continued)

OTHER PUBLICATIONS

Search Report and Written Opinion dated Feb. 27, 2013 for International Application No. PCT/US2012/048714 (10 pgs.).
(Continued)

*Primary Examiner* — Matthew Merkling
(74) *Attorney, Agent, or Firm* — Timothy S. Westby; Porter Hedges LLP

(57) ABSTRACT

A system configured for the production of at least one product selected from the group consisting of syngas, Fischer-Tropsch synthesis products, power, and chemicals, the system comprising a dual fluidized bed gasification apparatus and at least one apparatus selected from power production apparatus configured to produce power from the gasification product gas, partial oxidation reactors configured for oxidation of at least a portion of the product gas, tar removal apparatus configured to reduce the amount of tar in the product gas, Fischer-Tropsch synthesis apparatus configured to produce Fischer-Tropsch synthesis products from at least a portion of the product gas, chemical production apparatus configured for the production of at least one non-Fischer-Tropsch product from at least a portion of the product gas, and dual fluidized bed gasification units configured to alter the composition of the product gas. Methods of operating the system are also provided.

30 Claims, 2 Drawing Sheets

(51) Int. Cl.
*B01J 19/00* (2006.01)
*F02G 3/00* (2006.01)
*C10J 3/48* (2006.01)
*C10K 3/00* (2006.01)
*C10G 2/00* (2006.01)

(52) U.S. Cl.
CPC ... *C10K 3/00* (2013.01); *F02G 3/00* (2013.01); *C10J 2300/0909* (2013.01); *C10J 2300/0916* (2013.01); *C10J 2300/165* (2013.01); *C10J 2300/1637* (2013.01); *C10J 2300/1659* (2013.01); *C10J 2300/1807* (2013.01); *C10J 2300/1823* (2013.01); *Y02E 50/32* (2013.01)

(56) References Cited

U.S. PATENT DOCUMENTS

| | | | |
|---|---|---|---|
| 4,444,007 | A | 4/1984 | Mitchell et al. |
| 5,242,662 | A | 9/1993 | Toth |
| 5,508,118 | A | 4/1996 | Hayashi et al. |
| 5,645,620 | A | 7/1997 | Shenker |
| 5,666,801 | A * | 9/1997 | Rohrer ............... 60/781 |
| 6,025,403 | A | 2/2000 | Marler et al. |
| 6,494,153 | B1 | 12/2002 | Lyon |
| 6,808,543 | B2 | 10/2004 | Paisley |
| 7,291,255 | B2 | 11/2007 | Fujimura et al. |
| 7,879,756 | B2 | 2/2011 | Demirel et al. |
| 7,951,350 | B1 | 5/2011 | Taylor |
| 8,025,458 | B2 | 9/2011 | Fan et al. |
| 8,084,656 | B2 | 12/2011 | Feldmann |
| 8,241,523 | B2 | 8/2012 | Apanel et al. |
| 2003/0083390 | A1 | 5/2003 | Shah et al. |
| 2003/0083391 | A1 | 5/2003 | Jahnke et al. |
| 2008/0244976 | A1 | 10/2008 | Paisley |
| 2009/0062108 | A1 | 3/2009 | Demirel et al. |
| 2009/0075814 | A1 | 3/2009 | Duvenhage et al. |
| 2009/0298678 | A1 | 12/2009 | Demirel et al. |
| 2010/0024297 | A1 | 2/2010 | Suda et al. |
| 2010/0162625 | A1 | 7/2010 | Mills |
| 2010/0181539 | A1 | 7/2010 | Apanel et al. |
| 2010/0311570 | A1 | 12/2010 | Duvenhage et al. |
| 2011/0120560 | A1 | 5/2011 | Proll et al. |
| 2011/0142721 | A1* | 6/2011 | Murakami et al. ............ 422/139 |
| 2011/0147666 | A1 | 6/2011 | Troxclair |

FOREIGN PATENT DOCUMENTS

| | | |
|---|---|---|
| EP | 0444927 | 9/1991 |
| EP | 2273192 | 1/2001 |
| WO | 0250214 | 6/2002 |
| WO | 2010014939 | 2/2010 |
| WO | 2010142533 | 12/2010 |
| WO | 2011031752 | 3/2011 |

OTHER PUBLICATIONS

Search Report and Written Opinion dated Jan. 30, 2013 for International Application No. PCT/US2012/048715 (12 pgs.).
Search Report and Written Opinion dated Jan. 30, 2013 for International Application No. PCT/US2012/048717 (14 pgs.).
Search Report and Written Opinion dated Jan. 30, 2013 for International Application No. PCT/US2012/048718 (16 pgs.).
Search Report and Written Opinion dated Feb. 27, 2013 for International Application No. PCT/US2012/048719 (10 pgs.).
International Preliminary Report on Patentability dated Jan. 28, 2014 for International Application No. PCT/US2012/048714 (6 pgs.).
International Preliminary Report on Patentability dated Feb. 6, 2014 for International Application No. PCT/US2012/048715 (9 pgs.).
International Preliminary Report on Patentability dated Feb. 6, 2014 for International Application No. PCT/US2012/048717 (11 pgs.).
International Preliminary Report on Patentability dated Jan. 28, 2014 for International Application No. PCT/US2012/048718 (11 pgs.).
International Preliminary Report on Patentability dated Jan. 28, 2014 for International Application No. PCT/US2012/048719 (6 pgs.).
Fan et al., "Utilization of Chemical Looping Strategy in Coal Gasification Processes", Particuology, Elsevier, Amsterdam, NL, vol. 6, No. 3, dated Jun. 1, 2008, pp. 131-142 (12 pgs.).
Office Action dated Oct. 2, 2014 for corresponding U.S. Appl. No. 13/555,770 (10 pgs.).
Office Action dated Dec. 23, 2014 for corresponding U.S. Appl. No. 13/555,748 (18 pgs.).
European Search Report dated Feb. 9, 2015 for corresponding European Application No. 12818341.5 (10 pgs.).
European Search Report dated Feb. 6, 2015 for corresponding European Application No. 12817009.9 (8 pgs.).
European Search Report dated Feb. 4, 2015 for corresponding European Application No. 12816822.6 (11 pgs.).
Office Action dated Nov. 20, 2014 for corresponding U.S. Appl. No. 13/555,761 (5 pgs.).
Office Action dated Nov. 28, 2014 for corresponding U.S. Appl. No. 13/555,739 (16 pgs.).
Office Action dated May 28, 2015 for corresponding U.S. Appl. No. 13/555,748 (19 pgs.).
Office Action dated May 4, 2015 for corresponding U.S. Appl. No. 13/555,739 (20 pgs.).
Office Action dated Apr. 15, 2015 for corresponding U.S. Appl. No. 13/555,732 (13 pgs.).
Office Action dated Mar. 17, 2015 for corresponding U.S. Appl. No. 13/555,770 (4 pgs.).
Office Action dated Jun. 8, 2015 for corresponding U.S. Appl. No. 14/696,232 (21 pgs.).
Notice of Allowance dated Mar. 13, 2015 for corresponding U.S. Appl. No. 13/555,761 (7 pgs.).
Canadian Action dated Mar. 27, 2015 for corresponding Canada Application No. 2,843,040 (4 pgs.).
Canadian Action dated Mar. 26, 2015 for corresponding Canada Application No. 2,843,038 (4 pgs.).
Canadian Action dated Mar. 12, 2015 for corresponding Canada Application No. 2,842,096 (4 pgs.).
European Search Report dated Feb. 6, 2015 for corresponding European Application No. 12818173.2 (10 pgs.).

* cited by examiner

GASIFICATION SYSTEM AND METHOD

CROSS-REFERENCE TO RELATED APPLICATIONS

This application claims the benefit under 35 U.S.C. §119(e) of U.S. Provisional Patent Application No. 61/512,365, filed Jul. 27, 2011, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This disclosure relates generally to the field of gasification. More specifically, the disclosure relates to a system and method for the production of synthesis gas via gasification of carbonaceous materials. Still more specifically, the disclosed system and method are suitable for the production of synthesis gas for use in the Fischer-Tropsch synthesis of hydrocarbons, the production of power, the production of non-Fischer-Tropsch chemicals/fuels, or a combination thereof.

2. Background of Invention

Gasification is utilized to produce process gas suitable for the production of various chemicals, for the production of Fischer-Tropsch liquid hydrocarbons, and for the production of power. Many feed materials serve as carbonaceous sources for gasification, including, for example, shredded bark, wood chips, sawdust, sludges (e.g., sewage sludge), municipal solid waste, RDF, and a variety of other carbonaceous materials.

Fischer-Tropsch (FT) synthesis represents a catalytic method for the creation of synthetic liquid fuels. The reaction occurs by the metal catalysis of an exothermic reaction between carbon monoxide and hydrogen gas in mixtures known as synthesis gas, or 'syngas'. The liquid product of the reaction is typically refined to produce a range of synthetic fuels, lubricants and waxes. The primary metals utilized as catalysts are cobalt and iron. Providing synthesis gas having a desired molar ratio of hydrogen to carbon monoxide is necessary for economic production of Fischer-Tropsch synthesis products.

There is a need in the art for improved systems and methods of gasification, whereby materials (that may be generally considered waste) may be converted to gas suitable for the production of power and/or for the production of various chemicals and/or fuels (including, without limitation, Fischer-Tropsch synthesis products).

SUMMARY

Herein disclosed is a system configured for the production of at least one product selected from the group consisting of synthesis gas, Fischer-Tropsch synthesis products, power, and chemicals, the system comprising: a dual fluidized bed gasification apparatus including a gasifier and a combustor, wherein the combustor is configured for heating a particulate heat transfer material, thus producing a combustor flue gas; and wherein the gasifier is configured to receive the heated particulate heat transfer material and a carbonaceous feedstock, whereby the heated particulate heat transfer material provides heat for endothermic gasification of the carbonaceous feedstock, thus producing a gasification product gas comprising hydrogen and carbon monoxide; and at least one apparatus selected from the group consisting of power production apparatus configured to produce power from at least a portion of the gasification product gas, partial oxidation reactors configured for oxidation of at least a portion of the gasification product gas, tar removal apparatus configured to reduce the amount of tar in the gasification product gas, Fischer-Tropsch synthesis apparatus configured to produce Fischer-Tropsch synthesis products from at least a portion of the gasification product gas, chemical production apparatus configured for the production of at least one non-Fischer-Tropsch product from at least a portion of the gasification product gas, and dual fluidized bed gasification units configured to alter the composition of at least a portion of the gasification product gas.

In embodiments, the system comprises Fischer-Tropsch synthesis apparatus. The Fischer-Tropsch synthesis apparatus may be operable with an iron-based Fischer-Tropsch catalyst; and (a) the dual fluidized bed gasification apparatus is operable to provide a gasification product gas having a molar ratio of hydrogen to carbon monoxide that is in the range of from about 0.5:1 to about 1.5:1, (b) the system further comprises apparatus configured to adjust the molar ratio of hydrogen to carbon monoxide in at least a portion of the gasification product gas to a value in the range of from about 0.5:1 to about 1.5:1, or both (a) and (b). In embodiments, the Fischer-Tropsch synthesis apparatus is operable with a cobalt-based Fischer-Tropsch catalyst; and (a) the dual fluidized bed gasification apparatus is operable to provide a gasification product gas having a molar ratio of hydrogen to carbon monoxide in the range of from about 1.5:1 to about 2.5:1, (b) the system further comprises apparatus configured to adjust the molar ratio of hydrogen to carbon monoxide in at least a portion of the gasification product gas to a value in the range of from about 1.5:1 to about 2.5:1, or both (a) and (b). The Fischer-Tropsch synthesis apparatus may comprise at least one Fischer-Tropsch synthesis reactor configured to produce non-gaseous Fischer-Tropsch synthesis products from at least a portion of the gasification product gas. The Fischer-Tropsch synthesis reactor may be further operable to provide a Fischer-Tropsch tailgas. In such embodiments, the system may further comprise a recycle line whereby at least a portion of the Fischer-Tropsch tailgas can be introduced into the dual fluidized bed gasification apparatus. In embodiments, at least a portion of the Fischer-Tropsch tailgas is introduced into a system component selected from the group consisting of the combustor, the gasifier, and seal pots configured to prevent backflow of material from the combustor or from the gasifier.

The system may comprise power production apparatus. The power production apparatus may comprise a gas turbine.

In embodiments, the system comprises a Fischer-Tropsch synthesis apparatus comprising a solid/liquid separator configured for separating a spent catalyst product comprising Fischer-Tropsch catalyst and Fischer-Tropsch synthesis product from the non-gaseous Fischer-Tropsch synthesis products. Such a system may further comprise one or more recycle lines configured to introduce at least a portion of the spent catalyst product into the dual fluidized bed gasification apparatus. The system may comprise at least one recycle line selected from the group consisting of recycle lines fluidly connecting the solid/liquid separator with the combustor, whereby spent catalyst product can be introduced into the combustor for use as fuel; and recycle lines fluidly connecting the solid/liquid separator with the gasifier, whereby additional product gas can be produced via gasification of at least a portion of the spent catalyst product.

In embodiments, the gasifier is configured to convert at least a portion of the carbonaceous feedstock to char and the system is configured for transfer of the char out of the gasifier. In embodiments, the system is configured for transfer of at least a portion of the char to the combustor, and the combustor is configured to combust the char to provide at least a portion of the heat for heating the particulate heat transfer material. In embodiments, the combustor is configured for operation with substantially no fuel other than the char. In embodiments, the combustor is configured for operation with a supplemental fuel selected from the group consisting of tar, Fischer-Tropsch wax, Fischer-Tropsch tailgas, upgrader tailgas, refinery tank bottoms, heavy fuel oil, liquid fuel oil, and combinations thereof.

In embodiments, the system comprises a tar removal apparatus, and the supplemental fuel to the combustor comprises tar removed via the tar removal apparatus. In embodiments, the system comprises a tar removal apparatus, and the system further comprises at least one recycle line selected from the group consisting of recycle lines fluidly connecting the tar removal apparatus with the combustor, whereby at least a portion of the tar removed via the tar removal apparatus can be combusted to heat the particulate heat transfer material; and recycle lines fluidly connecting the tar removal apparatus with the gasifier, whereby at least a portion of the tar removed via the tar removal apparatus can be gasified to provide additional gasification product gas.

In embodiments, the system comprises Fischer-Tropsch synthesis apparatus, and the supplemental fuel to the combustor comprises Fischer-Tropsch tailgas, Fischer-Tropsch wax (e.g. liquid FT products), or both produced in the Fischer-Tropsch synthesis apparatus.

In embodiments, the system comprises Fischer-Tropsch synthesis apparatus and upgrading apparatus located downstream of the Fischer-Tropsch synthesis apparatus, and the supplemental fuel to the combustor comprises upgrader tailgas produced in the upgrading apparatus.

In embodiments, the gasifier is configured for operation at a gasifier pressure and the combustor is configured for operation at a combustor pressure in the range of from about 0 psig to a pressure that is at least 2 psig less than the gasifier pressure.

In embodiments, the gasifier is configured to provide an entrained product comprising particulate heat transfer material entrained in gasification product gas, and the system comprises at least one particulate separator selected from the group consisting of gasifier particulate separators configured to separate gasification product gas from the entrained product; and combustor particulate separators configured to separate heated particulate heat transfer material from the combustor flue gas. Such a system may further comprise at least one expander downstream of at least one combustor particulate separator. The system may further comprise heat recovery apparatus downstream of the at least one expander. The system may comprise at least one combustor particulate separator that is a cyclone, and the at least one combustor cyclone may be operable at a superficial velocity in the range of from about 70 to about 85 ft/s.

In embodiments, the system comprises (a) at least one primary gasifier particulate separator configured to separate particulate heat transfer material from the entrained product, thus providing a particulate-reduced product comprising ash, and at least one secondary gasifier particulate separator configured to separate particulate heat transfer material from the particulate-reduced product, (b) at least one primary combustor particulate separator configured to separate particulate heat transfer material from the flue gas, thus providing a particulate-reduced flue gas comprising ash, and at least one secondary combustor particulate separator configured to separate particulate heat transfer material from the particulate-reduced flue gas; or both (a) and (b). Such a system may be configured for introduction of the separated particulate materials from the primary gasifier particulate separator, the secondary gasifier particulate separator, or both into the combustor for heating therein and/or may further comprise a scrubber downstream of the secondary gasifier particulate separator, a scrubber downstream of the secondary combustor particulate separator, or both, wherein the scrubber is configured to scrub sulfur from a gas introduced thereto, via contact thereof with a liquid comprising at least a portion of the ash. In embodiments, the at least one primary gasifier particulate separator, the at least one primary combustor particulate separator, or both is configured for removal of greater than 99, 99.9, or 99.98 weight percent of the particulate heat transfer material from a gas introduced thereto. In embodiments, the at least one secondary gasifier particulate separator, the at least one secondary combustor particulate separator, or both is configured for removal of greater than about 60, 70, 80, 85, or 90 weight percent of the ash from a gas introduced thereto.

Various embodiments of the system comprise one or more heat recovery apparatus configured for recovery of heat from the gasification product gas, from the combustor flue gas, or from both the gasification product gas and the combustor flue gas. In embodiments, the system comprises tar removal apparatus, and heat recovery apparatus configured for utilization of the heat from the gasification product gas, wherein the heat recovery apparatus is configured to reduce the temperature of the gasification product gas to no less than about 800° F., 700° F., or 600° F. upstream of the tar removal apparatus. The at least one heat recovery apparatus may comprise at least one component selected from the group consisting of air preheaters, boiler feedwater preheaters, steam superheaters, waste heat boilers, waste heat superheaters, and economizers. In embodiments, the system comprises an air preheater configured to recover heat from the gasification product gas and introduce heated air into the combustor. In embodiments, the system comprises (a) at least one heat recovery apparatus located downstream of the at least one primary gasifier particulate separator, (b) at least one heat recovery apparatus located downstream of the at least one primary combustor particulate separator, or both (a) and (b). In embodiments, the system comprises (a) at least one heat recovery apparatus located upstream of the at least one secondary gasifier particulate separator, (b) at least one heat recovery apparatus located upstream of the at least one secondary combustor particulate separator, or both (a) and (b). In embodiments, the system comprises at least one secondary particulate separator located downstream of the at least one heat recovery apparatus and operable at a temperature of less than about 400° F.

In embodiments, the system comprises heat recovery apparatus downstream of at least one particulate separator. In embodiments, the system comprises at least one sealing apparatus selected from seal pots and valves configured to prevent backflow of material from the combustor into the at least one gasifier particulate separator or from the gasifier into the at least one combustor particulate separator. The valve may be selected from J-valves and L-valves. In embodiments, the system comprises a J-valve configured to prevent backflow of material from the gasifier into the at least one combustor particulate separator. In embodiments, the system comprises at least one seal pot selected from combustor seal pots configured to prevent backflow of material from the combustor into the at least one gasifier particulate separator and gasifier seal pots configured to prevent backflow of material from the gasifier into the at least one combustor particulate separator. The at least one seal pot may be configured for operation at a minimum fluidization velocity of greater than about 0.2 ft/s. The at least one seal pot may be configured for operation at a minimum fluidization velocity of greater than about 1.5 ft/s. The pressure drop across the at least one seal pot may be at least 2 psig, and/or less than about 20 psig. In embodiments, the at least one particulate separator comprises a dipleg extending from at or near a bottom thereof, and the dipleg extends a distance into the at least one seal pot from at or near a top thereof. The at least one seal pot may comprise a distributor and the dipleg of the at least one particulate separator may extend to a distance no less than about 10, 11, 12, 13, 14, 15, 16, 17, or 18 inches from the seal pot distributor. In embodiments, the minimum distance from the dipleg to a side or bottom of the seal pot is at least 10 inches.

In embodiments, the system comprises at least two gasifier particulate separators, each comprising a dipleg extending a distance into a combustor seal pot; at least two combustor particulate separators, each comprising a dipleg extending a distance into a gasifier seal pot; or both, wherein the minimum dipleg to dipleg separation within a seal pot is at least 10 inches. In embodiments, an angle selected from the group consisting of an angle formed between an at least one combustor seal pot and the combustor and an angle formed between an at least one gasifier seal pot and the gasifier is in the range of from about 5° to about 90°. In embodiments, the angle is less than about 45°. In embodiments, the system comprises at least one combustor seal pot, and the at least one combustor seal pot is fluidized by a combustor seal pot fluidization gas. The combustor may be configured for fluidization with a combustor fluidization gas (which may be introduced via line 121) comprising primarily air or oxygen. In embodiments, the combustor is configured for operation with excess oxygen in the range of from about 0 to about 20 volume percent. In embodiments, at least or about 20% of the combustor fluidization gas needed in the combustor is introduced via at least one combustor seal pot. The at least one seal pot may be substantially round or substantially rectangular. In embodiments, the at least one seal pot is substantially rectangular and the operating pressure of the at least one rectangular seal pot is less than about 15 psig.

In embodiments of the system, the particulate heat transfer material is selected from the group consisting of sand, limestone, and other calcites or oxides including iron oxide, olivine, and magnesia, alumina, carbides, silica alumina, zeolites, and combinations thereof. The particulate heat transfer material may comprise a catalyst.

In embodiments, the system comprises a carbonaceous material feed inlet fluidly connected with the gasifier, and configured for introduction of the carbonaceous feedstock into the gasifier. In embodiments, an angle formed between the carbonaceous material feed inlet and the gasifier is in the range of from about 5° to about 20°. The carbonaceous feedstock may comprise at least one material selected from the group consisting of biomass, RDF, MSW, sewage sludge, coal, Fischer-Tropsch synthesis wax, and combinations thereof. In embodiments, the gasifier is operable with carbonaceous feedstocks at any temperature in the range of from about −40° F. to about 260° F. The system may be configured for introduction of a purge gas with the carbonaceous feedstock. The purge gas may be selected from the group consisting of carbon dioxide, steam, fuel gas, nitrogen, synthesis gas, combustor flue gas, and combinations thereof. The system may comprise apparatus (e.g. downstream apparatus 100) for the removal of carbon dioxide from the combustor flue gas, the gasification product gas, or both; and one or more recycle lines fluidly connecting the carbon dioxide removal apparatus (e.g. via line 117) with a gasifier carbonaceous material feed inlet, whereby at least a portion of the removed carbon dioxide can be introduced into the gasifier as purge gas.

In embodiments, the combustor is operable such that an operating temperature at or near an inlet thereto for heat transfer material is in the range of from about 1000° F. to about 1400° F., and an operating temperature at or near the exit thereof to a combustor particulate separator is in the range of from about 1400° F. to about 1800° F. The system may comprise a dryer upstream of the gasifier, wherein the dryer is configured to remove moisture from the carbonaceous feedstock prior to introduction thereof into the gasifier. The system may comprise a line configured for introducing at least a portion of the combustor flue gas into the dryer, whereby hot combustor flue gas can be utilized to dry the carbonaceous feedstock. In embodiments, the gasifier is operable with a carbonaceous feedstock having a moisture content in the range of from about 10 to about 40 weight percent.

The system may be operable to convert at least about 30, 40, 50, 60, 70, or 80% of the carbon in the carbonaceous feedstock into gasification product gas. In embodiments, the gasifier is operable at a carbonaceous feedstock rate of at least 2000 lb/h-ft$^2$, 2400 lb/h-ft$^2$, 2500 lb/h-ft$^2$, 3000 lb/h-ft$^2$, 3400 lb/h-ft$^2$, or 4000 lb/h-ft$^2$. In embodiments, the gasifier is configured for fluidization with a gasifier fluidization gas having an inlet gasifier fluidization gas superficial velocity in the range of from about 0.5 ft/s to about 10 ft/s. In embodiments, the gasifier is operable at an outlet superficial velocity of gasification product gas comprising entrained particulate heat transfer material in the range of from about 35 to about 50 ft/s. In embodiments, the gasifier is operable at an operating temperature in the range of from about 1000° F. to about 1600° F. In embodiments, the gasifier is operable at an operating pressure of greater than about 2 psig. In embodiments, the gasifier is operable at an operating pressure of less than about 45 psig. In embodiments, the combustor is configured for fluidization with a combustor fluidization gas having an inlet combustor fluidization gas superficial velocity in the range of from about 15 to about 25 ft/s. In embodiments, the combustor is operable with an outlet flue gas superficial velocity in the range of from about 25 to about 40 ft/s. In embodiments, the gasifier comprises a gasifier distributor configured to introduce gasifier fluidization gas substantially uniformly across the diameter of the gasifier, the combustor comprises a combustor distributor configured to introduce combustor fluidization gas substantially uniformly across the diameter of the combustor, or both. In embodiments, the combustor is configured to receive particulate heat transfer material at a location at least about 4, 5, or 6 inches above the combustor distributor; the gasifier is configured to receive heated fluidized particulate heat transfer material at a location at least about 4, 5, or 6 inches above the gasifier distributor; or both.

In embodiments, the system is operable to provide, from the combustor to the gasifier, heated fluidized particulate heat transfer material having a temperature in the range of from about 1400° F. to about 1600° F. In embodiments, the operating temperature differential between the gasifier and the combustor is less than about 300° F. In embodiments, the system optionally comprises at least one seal pot selected from combustor seal pots configured to prevent backflow of material from the combustor into the at least one gasifier particulate separator, and gasifier seal pots configured to prevent backflow of material from the gasifier into the at least one combustor particulate separator; and at least one component selected from the group consisting of the gasifier, the combustor, the at least one combustor seal pot, and the at least one gasifier seal pot is configured with a dead zone between a distributor and a bottom thereof, such that tramp removal may be performed during operation.

Also disclosed herein is a method comprising: introducing a carbonaceous feedstock and a heated particulate heat transfer material into a gasifier comprising a fluidized bed, whereby at least a portion of the carbonaceous material is pyrolyzed to produce a gasification product gas comprising hydrogen and carbon monoxide, and wherein the fluidized bed comprises particulate heat transfer material fluidized by introducing a gasifier fluidization gas into the gasifier; removing, from a lower average density entrained space region of the gasifier, a gasification product gas comprising, entrained therein, char, particulate heat transfer material, and optionally unreacted carbonaceous feedstock; separating at least one solids product comprising char, particulate heat transfer material, and optionally unreacted carbonaceous material from the gasification product gas, providing a particulate-reduced product gas; heating at least a portion of the at least one solids product by passing same through a combustor, thus producing a heated portion of the at least one solids product and a combustor flue gas, wherein at least a portion of the heat for heating is obtained via combustion of the char in the at least a portion of the at least one solids product; and introducing at least a portion of the heated portion of the at least one solids product into the gasifier, providing heat for pyrolysis. In embodiments, the product comprises Fischer-Tropsch synthesis products, and the method further comprises subjecting at least a portion of the gasification product gas to Fischer-Tropsch synthesis. Subjecting at least a portion of the gasification product gas to Fischer-Tropsch synthesis may comprise contacting the at least a portion of the gasification product gas with an iron-based Fischer-Tropsch catalyst. The method may further comprise adjusting the molar ratio of hydrogen to carbon monoxide in the gasification product gas to provide a molar ratio in the range of from about 0.5:1 to about 1.5:1 prior to subjecting the at least a portion of the gasification product gas to Fischer-Tropsch synthesis. Adjusting may comprise subjecting the gasification product gas to partial oxidation. Subjecting at least a portion of the gasification product gas to Fischer-Tropsch synthesis may comprise contacting the at least a portion of the gasification product gas with a cobalt-based Fischer-Tropsch catalyst. Such methods may further comprise adjusting the molar ratio of hydrogen to carbon monoxide in the gasification product gas to provide a molar ratio in the range of from about 1.5:1 to about 2.5:1 prior to subjecting the at least a portion of the gasification product gas to Fischer-Tropsch synthesis. Subjecting at least a portion of the gasification product gas to Fischer-Tropsch synthesis may produce non-gaseous Fischer-Tropsch synthesis products, a Fischer-Tropsch tailgas, and a spent catalyst product comprising spent Fischer-Tropsch catalyst and liquid hydrocarbons. The method may comprise introducing at least a portion of a Fischer-Tropsch tailgas into a component selected from the group consisting of the combustor, the gasifier, and seal pots configured to prevent backflow of material from the combustor or from the gasifier. The method may comprise introducing at least a portion of the spent catalyst product into the gasifier, the combustor, or both.

In embodiments, the method further comprises producing power via at least a portion of the gasification product gas. The method may comprise producing power from at least about 10, 20, or 30 volume percent of the gasification product gas, and subjecting at least a portion of the remaining gasification product gas to Fischer-Tropsch synthesis.

In embodiments, the method comprises introducing a supplemental fuel into the combustor. The supplemental fuel may be selected from the group consisting of tar, Fischer-Tropsch wax, Fischer-Tropsch tailgas, upgrader tailgas, refinery tank bottoms, heavy fuel oil, liquid fuel oil, and combinations thereof. In embodiments, the method further comprises removing tar from the gasification product gas and utilizing at least a portion of the removed tar as supplemental fuel for the combustor, as carbonaceous feedstock for the gasifier, or both. The method may comprise subjecting at least a portion of the gasification product gas to Fischer-Tropsch synthesis, thus producing non-gaseous Fischer-Tropsch synthesis products, a Fischer-Tropsch tailgas, and a spent catalyst product comprising spent Fischer-Tropsch catalyst and liquid hydrocarbons, and utilizing at least a portion of the Fischer-Tropsch tailgas, at least a portion of the spent catalyst product, or both as supplemental fuel to the combustor. The method may comprise subjecting at least a portion of the gasification product gas to Fischer-Tropsch synthesis, thus producing non-gaseous Fischer-Tropsch synthesis products, and subjecting at least a portion of the non-gaseous Fischer-Tropsch synthesis products to upgrading, thus producing an upgrader tailgas. In embodiments, the method comprises utilizing at least a portion of an upgrader tailgas as supplemental fuel for the combustor.

In embodiments, the method comprises operating the gasifier at a gasifier pressure and operating the combustor at a combustor pressure that is in the range of from about 0 psig to a pressure that is at least 2 psig less than the gasifier pressure. In embodiments, the method comprises separating heated particulate heat transfer material from the combustor flue gas. Separating heated particulate heat transfer material from the combustor flue gas may comprise introducing the combustor flue gas into at least one combustor gas/solid separator. In embodiments, the at least one combustor gas/solid separator is operated at a superficial velocity in the range of from about 70 to about 85 ft/s. In embodiments, (a) separating at least one solids product comprising char, particulate heat transfer material and optionally unreacted carbonaceous material from the gasification product gas comprises introducing at least a portion of the gasification product gas into at least one primary gasifier particulate separator configured to separate particulate heat transfer material from the gasification product gas, thus providing a particulate-reduced product gas comprising ash, and introducing the particulate-reduced product gas comprising ash entrained therein into at least one secondary gasifier particulate separator configured to separate ash from the particulate-reduced product gas, (b) separating heated particulate heat transfer material from the combustor flue gas comprises introducing at least a portion of the combustor flue gas into at least one primary combustor particulate separator configured to separate particulate heat transfer material from the combustor flue gas, thus providing a particulate-reduced flue gas comprising ash, and introducing the particulate-reduced flue gas into at least one secondary combustor particulate separator configured to separate ash from the particulate-reduced flue gas; or both (a) and (b). Such methods may further comprise introducing at least a portion of the separated particulate materials from the primary gasifier particulate separator, the secondary gasifier particulate separator, or both into the combustor for heating therein. The method may further comprise scrubbing sulfur from a gas by contacting the gas with a liquid comprising at least a portion of the separated ash. The gas scrubbed may comprise at least a portion of the gasification product gas.

In embodiments, the method comprises removing more than 99, 99.9, or 99.98 weight percent of the particulate heat transfer material from the gasification product gas, from the combustor flue gas, or both. In embodiments, the method comprises recovering heat from the gasification product gas, from the combustor flue gas, or both. Ash may be removed from the gasification product gas, the combustor flue gas, or both, subsequent to heat recovery therefrom. Tar may be removed from the gasification product gas after recovering heat therefrom. Recovering heat from the gasification gas may reduce the temperature of the gasification product gas to no less than about 900° F., 850° F., 800° F., 750° F. 700° F., 650° F. or 600° F., prior to removing tar therefrom. Recovering heat may comprise heating air via heat transfer with the gasification product gas, the combustor flue gas, or both, and the method may comprise introducing at least a portion of the heated air into the combustor.

In embodiments, the method comprises fluidizing the combustor via a combustor fluidization gas. The combustor may be fluidized with a combustor fluidization gas having an inlet combustor fluidization gas superficial velocity in the range of from about 15 to about 25 ft/s. The combustor may be operated with an outlet flue gas superficial velocity in the range of from about 25 to about 40 ft/s. At least a portion of the combustor fluidization gas may be introduced via at least one combustor seal pot configured to prevent backflow of material from the combustor. In embodiments, at least or about 20% of the combustor fluidization gas needed for fluidization of a bed in the combustor is introduced via the at least one combustor seal pot.

In embodiments, the method comprises preventing backflow of material from the gasifier via at least one gasifier seal pot, preventing backflow of material from the combustor via at least one combustor seal pot, or both. In embodiments, the particulate heat transfer material is selected from the group consisting of sand, limestone, and other calcites or oxides including iron oxide, olivine, and magnesia, alumina, carbides, silica alumina, zeolites, and combinations thereof. The method may comprise introducing a catalyst into the gasifier. Such a catalyst may promote tar reforming, thus generating a cleaner gasification product gas than formed in the absence of the catalyst. In embodiments, the catalyst comprises nickel.

In embodiments, the method comprises introducing a sulfur-extraction component, wherein the sulfur extraction component promotes recovery of sulfur in solid form from the gasification. The sulfur extraction component may comprise calcium oxide. The sulfur extraction component may be introduced with the heat transfer material.

In embodiments, the method comprises introducing a carbon dioxide removal component, the carbon dioxide removal component suitable to convert carbon dioxide into a solid product that is at least partially separated from the gasification product gas with the at least one solids product. The method may comprise operating the combustor with excess oxygen in the range of from about 0 to about 20 volume percent. The method may comprise introducing the carbonaceous feedstock at a temperature in the range of from about −40° F. to about 260° F. In embodiments, the carbonaceous feedstock comprises at least one material selected from the group consisting of biomass, RDF, MSW, sewage sludge, coal, Fischer-Tropsch synthesis wax, and combinations thereof. The method may comprise introducing a purge gas with or as a part of the carbonaceous feedstock. The purge gas may comprise at least one gas selected from the group consisting of carbon dioxide, steam, fuel gas, nitrogen, synthesis gas, and combustor flue gas. In embodiments, the method comprises removing carbon dioxide from the combustor flue gas, the gasification product gas, or both; and utilizing at least a portion of the removed carbon dioxide as purge gas. In embodiments, the method comprises operating the combustor at an operating temperature at or near an inlet thereto for heat transfer material in the range of from about 1000° F. to about 1400° F. and an operating temperature at or near an exit thereof to a combustor particulate separator in the range of from about 1400° F. to about 1800° F.

The method may comprise removing moisture from a relatively wet carbonaceous material to provide the carbonaceous feedstock. At least a portion of the heat from the combustor flue gas may be utilized to dry the carbonaceous material. The method may comprise drying a carbonaceous material to a moisture content in the range of from about 10 to about 40 weight percent to provide the carbonaceous feedstock. The method may comprise converting at least about 30, 40, 50, 60, 70, or 80% of the carbon in the carbonaceous feedstock into gasification product gas. The method may comprise introducing the carbonaceous feedstock to the gasifier at a flux of at least or about 2000 lb/h-ft$^2$, 2400 lb/h-ft$^2$, 2500 lb/h-ft$^2$, 3000 lb/h-ft$^2$, 3400 lb/h-ft$^2$, or 4000 lb/h-ft$^2$. The gasifier fluidization gas may be introduced into the gasifier at a superficial velocity in the range of from about 0.5 ft/s to about 10 ft/s. In embodiments, the method comprises removing the gasification product gas from the gasifier at a superficial velocity in the range of from about 35 to about 50 ft/s. The gasifier fluidization gas may be selected from the group consisting of steam, flue gas, synthesis gas, LP fuel gas, tailgas (e.g., Fischer-Tropsch tailgas, upgrader tailgas, VSA tailgas, and/or PSA tailgas), gasification product gas, and combinations thereof. The gasifier may be operated at an operating temperature in the range of from about 1000° F. to about 1600° F. The gasifier may be operated at an operating pressure of greater than about 2 psig and/or less than about 45 psig.

In embodiments, the gasifier comprises a gasifier distributor configured to introduce gasifier fluidization gas substantially uniformly across the diameter of the gasifier, the combustor comprises a combustor distributor configured to introduce combustor fluidization gas substantially uniformly across the diameter of the combustor, or both. The method may comprise introducing particulate heat transfer material into the combustor at a location at least about 4, 5, or 6 inches above a combustor distributor; introducing heated fluidized particulate heat transfer material from the combustor into the gasifier at a location at least about 4, 5, or 6 inches above a gasifier distributor; or both. At least a portion of the heated portion of the at least one solids product may be introduced into the gasifier at a temperature in the range of from about 1400° F. to about 1600° F. An operating temperature differential of less than about 350° F., 325° F., 300° F., 275° F., or 250° F. may be maintained between the gasifier and the combustor.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

The terms 'pyrolyzer' and 'gasifier' are used interchangeably herein to refer to a reactor configured for endothermal pyrolysis.

DETAILED DESCRIPTION

Overall Dual Fluidized Bed (DFB) System.

Herein disclosed are a dual fluidized bed gasification system, novel components thereof, and methods of gasification using same. Disclosed herein are a combustor, a pyrolyzer, combustor seal pot, gasifier seal pot, primary gasifier separator (e.g., heat transfer material, HTM, cyclone), secondary gasifier separator (e.g., ash cyclone), combustor separators (e.g., primary and/or secondary cyclones), and a system comprising a combination of one or more of these components and optionally comprising downstream apparatus configured for the production of chemicals, fuels, and/or power from the gas produced in the gasifier.

The disclosed method comprises introducing inlet gas at a low gas velocity to fluidize a high average density bed in a gasifier/pyrolysis vessel. The high average density bed may comprise a relatively dense fluidized bed in a lower region thereof, the relatively dense fluidized bed containing a circulating heated relatively fine and inert particulate heat transfer material. Carbonaceous material is introduced into the lower region at a relatively high rate and endothermal pyrolysis of the carbonaceous material is accomplished by means of a circulating heated inert material, producing a gasifier product gas comprising synthesis gas (i.e. comprising hydrogen and carbon monoxide). In embodiments, in an upper region of the pyrolyzer is a lower average density entrained space region containing an entrained mixture comprising inert solid, particulate heat transfer material, char, unreacted carbonaceous material and product gas. The entrained mixture is removed from the gasifier to one or more separators, such as a cyclone, wherein solids (heat transfer particles, char and/or unreacted carbonaceous material) are separated from the gasification product gas. At least a portion of the removed solids is returned to the pyrolyzer after reheating to a desired temperature via passage through an exothermic reaction zone of an external combustor.

Figure 1:
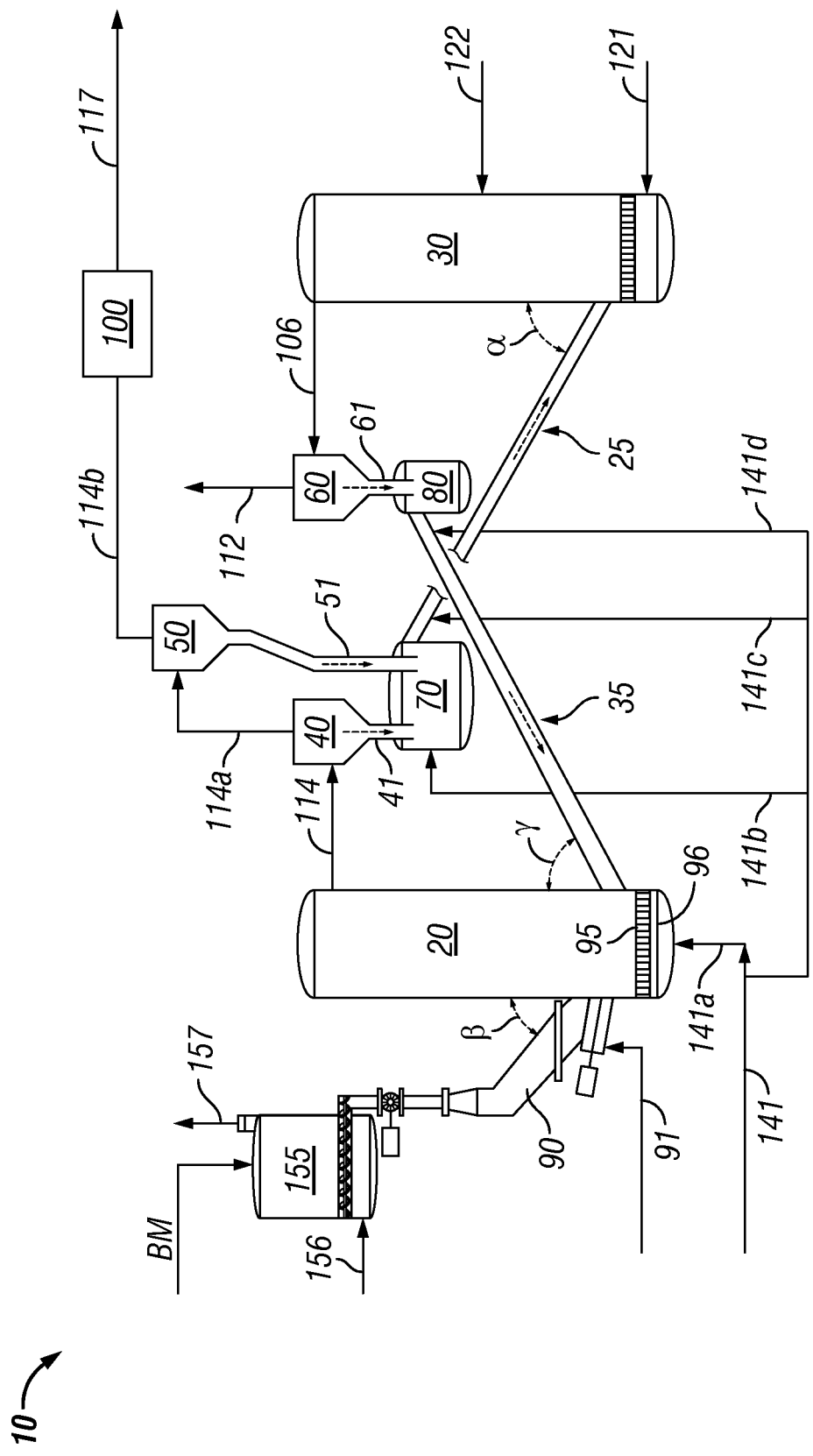
FIG. 1 is schematic of a gasification system according to this disclosure.

FIG. 1 is a schematic of a dual fluidized bed (or 'DFB') gasification system 10 according to this disclosure. DFB gasification system 10 comprises a gasifier 20 (also referred to herein as a 'pyrolyzer') that is fluidly connected with a combustor 30, whereby heat lost during endothermic gasification in gasifier/pyrolyzer 20 can be supplied via exothermic combustion in combustor 30, as discussed further hereinbelow. DFB gasification system 10 further comprises at least one combustor seal pot 70 and at least one gasifier seal pot 80. Pyrolyzer 20 is operable for removal therefrom of a circulating particulate phase and char by entrainment in gasifier product gas. Separation of solid, entrained particulates comprising particulate heat transfer material and char from the gasification product gas, can be accomplished by gas/solid separators, such as conventional cyclone(s). In embodiments, substantially all system solids are elutriated by the herein disclosed method despite the use of what are generally considered to be low inlet gasifier fluidization gas velocities. The DFB gasification system thus further comprises one or more gasifier particulate separator (e.g., one or more gasifier cyclones) and one or more combustor particulate separator (e.g., one or more combustor cyclones). In the embodiment of FIG. 1, DFB gasification system 10 comprises primary gasifier cyclones 40 and secondary gasifier cyclones 50 and combustor cyclones 60. Each of these components will be discussed in more detail hereinbelow.

Circulating between the gasifier and the combustor is a heat transfer material (HTM). The heat transfer material is relatively inert compared to the carbonaceous feed material being gasified. In embodiments, the heat transfer material is selected from the group consisting of sand, limestone, and other calcites or oxides such as iron oxide, olivine, magnesia (MgO), attrition resistant alumina, carbides, silica aluminas, attrition resistant zeolites, and combinations thereof. The heat transfer material is heated by passage through an exothermic reaction zone of an external combustor. In embodiments, the heat transfer material may participate as a reactant or catalytic agent, thus 'relatively inert' as used herein with reference to the heat transfer material is as a comparison to the carbonaceous materials and is not used herein in a strict sense. For example, in coal gasification, limestone may serve as a means for capturing sulfur to reduce sulfate emissions. Similarly, limestone may serve to catalytically crack tar in the gasifier. In embodiments, the gasifier may be considered a catalytic gasifier, and a catalyst may be introduced with or as a component of the particulate heat transfer material. For example, in embodiments, a nickel catalyst is introduced along with other heat transfer material (e.g., olivine or other heat transfer material) to promote reforming of tars, thus generating a 'clean' synthesis gas that exits the gasifier. The clean synthesis gas may be an essentially tar-free synthesis gas. In embodiments, an amount of nickel catalyst (e.g., about 5, 10, 15, or 20 weight percent nickel) is circulated along with other heat transfer materials.

The heat transfer material may have an average particle size in the range of from about 1 µm to about 100 mm, from about 1 µm to about 1 mm, or from about 5 µm to about 300 µm. The heat transfer material may have an average density in the range of from about 50 lb/ft$^3$ (0.8 g/cm$^3$) to about 500 lb/ft$^3$ (8 g/cm$^3$), from about 50 lb/ft$^3$ (0.8 g/cm$^3$) to about 300 lb/ft$^3$ (4.8 g/cm$^3$), or from about 100 lb/ft$^3$ (1.6 g/cm$^3$) to about 300 lb/ft$^3$ (4.8 g/cm$^3$).

In embodiments, equilibrium is pushed toward the formation of hydrogen and carbon monoxide during pyrolysis via, for example, the incorporation of a material that effectively removes carbon dioxide. For example, NaOH may be introduced into the system (e.g., to or with the heat transfer material, to gasifier 20, to combustor 30, or elsewhere in the system) to produce $Na_2CO_3$, and/or CaO injection may be utilized to absorb $CO_2$, forming $CaCO_3$ which may later be separated into $CO_2$ and CaO which may be recycled into the system. The NaOH and/or CaO may be injected into gasifier or pyrolyzer 20. Addition of such carbon dioxide reducing material may serve to increase the amount of synthesis gas produced (and thus available for downstream processes such as, without limitation, Fischer-Tropsch synthesis and non-Fischer-Tropsch chemical and/or fuel production), and/or may serve to increase the Wobbe number of the gasifier product gas for downstream power production. Such or further additional materials may also be utilized to adjust the ash fusion temperature of the carbonaceous feed materials within the gasifier. As with the optional carbon dioxide reducing materials, such ash fusion adjustment material(s) may be incorporated via addition with or to the feed, with or to the heat transfer media, to gasifier 20, to combustor 30, and/or elsewhere. In embodiments, the additional material(s) are added with or to the feed to the gasifier. In embodiments, the additional material(s) are added with or to the heat transfer media.

Reactor/Gasifier/Pyrolyzer 20.

Pyrolyzer 20 is a reactor comprising a fluid-bed of heat transfer material at the reactor base, and is operated at feed rates sufficiently high to generate enough gasifier product gas to promote circulation of heat transfer material and gasified char, for example, by entrainment. The gasifier may be a hybrid with an entrained zone above a fluidized bed gasifier, as described in U.S. Pat. No. 4,828,581, which is hereby incorporated herein by reference in its entirety for all purposes not contrary to this disclosure.

In embodiments, gasifier/pyrolyzer 20 is an annular shaped vessel comprising a conventional gas distribution plate near the bottom and comprising inlets for feed material(s), heat transfer material(s), and fluidizing gas. The gasifier vessel comprises an exit at or near the top thereof and is fluidly connected thereby (e.g. via gasifier outlet line 114) to one or more separators from which gasification product gas is discharged and solids are recycled to the bottom of the gasifier via an external, exothermic combustor operable to reheat the separated, heat transfer material. The gasifier operates with a recirculating particulate phase (heat transfer material) and at inlet gas velocities in the range sufficient to fluidize the heat transfer material, as further discussed hereinbelow.

Gasifier Feed.

As indicated in the embodiment of FIG. 1, the inlets for feed (e.g. via line 90) and recirculating heat transfer material (e.g. via 'hot' circulation line 35) are located at or near the base of gasifier 20, and may be proximate the pyrolyzer gas distributor 95. The feed may be selected from the group consisting of biomass, RDF, MSW, sewage sludge, and combinations thereof. In embodiments, the feed comprises biomass. It is envisaged that coal may be added to the gasifier if it is suitable coal, and this depends on the ash fusion temperature. Refinery tank bottoms, heavy fuel oil, etc, which may, in embodiments, be contaminated with small solids may be introduced into the gasifier and/or the combustor, so long as the ash fusion temperature therein is not adversely affected. In embodiments, petcoke is ground to a size in the range suitable to ensure volatilization within the pyrolyzer. In embodiments, petcoke is introduced into the pyrolyzer as a component of the carbonaceous feedstock. In embodiments, the gasifier feed further comprises Fischer-Tropsch synthesis products (e.g., Fischer-Tropsch wax) and/or spent catalyst (e.g., recycled spent catalyst in product wax). In embodiments, Fischer-Tropsch synthesis products are produced downstream and a portion of the Fischer-Tropsch product(s) (e.g., spent Fischer-Tropsch wax) that will crack under the operating conditions therein is recycled as feed/fuel to the gasifier.

The gasifier feed may be introduced thereto via any suitable means known to one of skill in the art. The feed may be fed to the gasifier using a water cooled rotary screw. The feed may be substantially solid and may be fed utilizing a screw feeder or a ram system. In embodiments, the feed is introduced into the gasifier as a solid extrudate. In embodiments, dual feed screws are utilized and operation is alternated therebetween, thus ensuring continuous feeding.

As indicated in FIG. 1, a gasifier feed inlet line 90 may be configured to provide an angle β between the feed inlet line 90 and gasifier vessel 20. The feed inlet angle β may be in the range of from about 5 to about 20 degrees or from about 10 to about 15 degrees such that the feed flows substantially uniformly into (i.e. across the cross section thereof) of pyrolyzer 20. In this manner, feed isn't limited to one side of the pyrolyzer, for example. A purge gas may also be introduced (e.g. via line 91) with the feed (for example, from a lockhopper) via the feed inlet to maintain a desired pressure and/or to aid in feeding the feed to the pyrolyzer. In embodiments, the purge gas is selected from the group consisting of carbon dioxide, steam, fuel gas, nitrogen, synthesis gas, flue gas from the combustor and combinations thereof. In embodiments, the purge gas comprises nitrogen. In embodiments, the feed is not purged. If $CO_2$ recovery is present, for example downstream in the system, it may be desirable for the feed purge gas to be or to comprise carbon dioxide.

In embodiments, the gasifier feed is pressurized. The carbonaceous feed material may be fed to the gasifier at a pressure in the range of from about 0 to about 40 psig. A dryer may be utilized to dry the feed and/or may be operated at a pressure, thus providing the feed material to the gasifier at a desired pressure and/or moisture content. The feed may be dried prior to introduction into the gasifier, and may be introduced hot (e.g., at a temperature of greater than room temperature). In embodiments, the feed is cold (e.g., at a temperature of less than room temperature). The feed may be introduced into the gasifier at a temperature in the range of from about −40 to about 260° F. In embodiments, the feed is at a temperature in the range of from −40 to about 250° F. In embodiments, the feed is at ambient temperature. In embodiments, a feed material is comminuted prior to introduction into the gasifier. In embodiments, a feed material is preheated and/or comminuted (e.g., chipped) prior to introduction into the gasifier.

Optimization of Gasifier Feed Drying to Control $H_2$:CO Ratio in Product Synthesis Gas.

In embodiments, the moisture content of the feed is in the range of from about 5% to about 60%. In embodiments, the feed has a moisture content of greater than about 10, 20, 30, or 40 wt %. In embodiments, the feed has a moisture content of less than about 10, 20, 30, or 40 wt %. In embodiments, the moisture content of the feed is in the range of from about 20 to about 30 wt %. In embodiments, the moisture content of the feed is in the range of from about 20 to about 25 wt %.

In embodiments, more drying of the feed material may be desired/utilized to provide syngas (via, for example, feed drying, gasification and/or partial oxidation) at a molar ratio of $H_2$/CO suitable for downstream Fischer-Tropsch synthesis in the presence of an iron catalyst (i.e. about 1:1). In embodiments, less drying may be desired/utilized, for example, to provide a synthesis gas having a molar ratio of $H_2$/CO suitable for downstream Fischer-Tropsch synthesis in the presence of a cobalt catalyst (i.e. about 2).

Energy Integration for Dryer.

A dryer 155 may be configured to reduce the moisture content of a 'wet' carbonaceous feed material (e.g. biomass, BM). Carbonaceous feed material (e.g. biomass) may be introduced into dryer 155 via carbonaceous feed material inlet line BM, drying fluid (e.g. 'hot' combustor flue gas) may be introduced into dryer 155 via drying agent inlet line 156, and/or dryer exhaust may be extracted from dryer 155 via dryer exhaust line 157. In embodiments, at least a portion of the hot combustor flue gas (described further hereinbelow) is utilized to dry a gasifier feed prior to introduction into gasifier 20. In such embodiments, combustor flue gas outlet line 112 may be fluidly connected with dryer 155, for example, via drying agent inlet line 156.

In embodiments, the feed rate (flux) of carbonaceous material to the gasifier is greater than or equal to about 2000, 2500, 3000, 3400, 3500, 4000, or 4200 lb/h/ft$^2$. The design may allow for a superficial velocity at the outlet (top) of the gasifier in the range of 40-45 ft/s (assuming a certain carbon conversion/volatilization/expansion). In embodiments, the carbon conversion is in the range of from about 0 to about 100%. In embodiments, the carbon conversion is in the range of from about 30 to about 80%. The gasifier vessel size, i.e. the diameter thereof, may be selected based on a desired outlet velocity.

Gasifier fluidization gas may be fed to the bottom of gasifier 20 (for example, via a distributor 95) at a superficial velocity in the range of from about 0.5 ft/s to about 10 ft/s, from about 0.8 ft/s to about 8 ft/s, or from about 0.8 ft/s to about 7 ft/s. In embodiments, the pyrolyzer fluidization gas (e.g., steam) inlet velocity is greater than, less than, or equal to about 1, 2, 3, 4, 5, 6, 7 or 8 ft/s. In embodiments, a gasifier fluidization gas superficial velocity of at least or about 5, 6, 7, or 8 ft/s is utilized during startup.

The fluidization gas introduced into the gasifier via line 141 and 141*a* (and optionally introduced into circulation line 35 via line 141*d*) may be selected from the group consisting of steam, flue gas, synthesis gas, LP fuel gas, tailgas (e.g., Fischer-Tropsch tailgas, upgrader tailgas, VSA tailgas, and/or PSA tailgas) and combinations thereof. In embodiments, the gasifier fluidization gas comprises Fischer-Tropsch tailgas. In embodiments, the gasifier fluidization gas comprises upgrader tailgas. By utilizing upgrader tailgas, additional sulfur removal may be effected, as the upgrader tailgas may comprise sulfur.

In embodiments, the pyrolyzer fluidization gas comprises PSA tailgas. Such embodiments may provide substantial hydrogen and may be most suitable for subsequent utilization of the product gas in downstream processes for which higher molar ratios of hydrogen to carbon monoxide is desirable. For example, higher molar ratios of hydrogen to carbon monoxide may be desirable for downstream processes such as a nickel dual fluidized bed gasification system (for which $H_2/CO$ ratio of about 1.8:1 to about 2:1 may be desired). Such a dual fluidized bed (DFB) gasifier is disclosed, for Example, in U.S. patent application Ser. No. 12/691,297 filed Jan. 21, 2010, now U.S. Pat. No. 8,241,523, the disclosure of which is hereby incorporated herein for all purposes not contrary to this disclosure. Utilization of PSA tailgas for gasifier fluidization gas may be less desirable for subsequent utilization of the gas for POx (for which $H_2/CO$ ratios closer to or about 1:1 may be more suited), as the hydrogen may be undesirably high. In embodiments, the gasification product gas is dried (for example, in a burner) to a moisture content of less than a desired amount (e.g., less than about 10, 11, 12, 13, 14, or 15 percent) in order to provide a suitable composition (e.g., $H_2/CO$ molar ratio) for downstream processing (e.g., for downstream POx). In embodiments, a combination of feed drying, DFB gasification and POx is utilized to provide a synthesis gas suitable for downstream Fischer-Tropsch synthesis utilizing a cobalt catalyst.

The temperature at or near the top of the gasifier (e.g., proximate entrained product removal therefrom) may be in the range of from about 1000° F. to about 1600° F., from about 1100° F. to about 1600° F., from about 1200° F. to about 1600° F., from about 1000° F. to about 1500° F., from about 1100° F. to about 1500° F., from about 1200° F. to about 1500° F., from about 1000° F. to about 1400° F., from about 1100° F. to about 1400° F., from about 1200° F. to about 1400° F., from about 1200° F. to about 1450° F., from about 1200° F. to about 1350° F., from about 1250° F. to about 1350° F., from about 1300° F. to about 1350° F. or about 1350° F.

In embodiments, the gasifier pressure is greater than about 2 psig. In embodiments, the gasifier pressure is less than or equal to about 45 psig. In embodiments, the gasifier pressure is in the range of from about 2 psig to about 45 psig.

Heat transfer material is introduced, via 'hot' circulation line 35, into a lower region of the gasifier. The heat transfer material may be introduced approximately opposite introduction of the gasifier feed material. To maintain suitable flow, the HTM inlet may be at an angle γ in the range of from about 20 degrees to about 90 degrees, or at an angle γ of greater than or about 20, 30, 40, 50, or 60 degrees. The heat transfer material may be introduced at a temperature in the range of from about 1400° F. to about 1600° F., from about 1450° F. to about 1600° F., from about 1525° F. to about 1575° F., or about 1550° F.

In embodiments, the pyrolyzer comprises a gas distributor 95. In embodiments, the heat transfer material is introduced to pyrolyzer 20 at a location at least 4, 5, 6, 7, 8, 9 or 10 inches above pyrolyzer gas distributor 95. The heat transfer material may be introduced at a position in the range of from about 4 to about 10 inches, or from about 4 to about 6 inches above the distributor. In embodiments, the distributor is operable to provide a gas flow rate of at least or about 4, 5, 6, 7, 8, 9, or 10 ft/s, for example, during startup. The gasifier distributor (and/or a distributor in a combustor seal pot, a gasifier seal pot, and/or the combustor) may comprise a ring distributor, a pipe distributor, a Christmas tree distributor, or other suitable distributor design known in the art. In embodiments, the distributor comprises a pipe distributor that may be loaded through a side of the vessel for ease of nozzle replacement thereon (generally suitable in embodiments in which the running pressure is less than 12 or 15 psig inclusive). Distributors with fewer inlets (e.g., Christmas tree distributors and/or ring distributors) may be more desirable for higher pressure applications.

In embodiments, the temperature differential between the gasifier and the combustor (i.e. $T_C-T_G$) is maintained at less than about 250° F., 260° F., 270° F., 280° F., 290° F., 300° F., 310° F., 320° F., 330° F., 340° F., or 350° F., or is maintained at a temperature within any range therebetween. If $T_C-T_G$ is greater than about 300° F., sand or other elevated temperature heat transfer material may be added to the system.

Tramp Removal System.

Gasifier distributor 95 may be positioned 3 to 6 feet above the refractory bottom. In embodiments, the distributor is positioned at least 3, 4, 5, or at least 6 feet above the refractory bottom. Below the distributor is thus created a dead space or 'dead zone' 96, as indicated (not to scale) in the embodiment of FIG. 1. Dead zone 96 is located between the distributor and the bottom of the vessel. In embodiments, such a dead zone may be designed to facilitate removal of heat transfer material from below a distributor. Any materials that are too heavy to fluidize may settle below the distributor of a system component, thus creating a heat sink area. Because there may be little or no fluidization below the distributor, heat transfer material may become trapped below the distributor and cool (e.g., to less than 1550° F. or to below another HTM inlet gasifier temperature). The bottom of the gasifier (or another component such as a combustor seal pot 70, a gasifier seal pot 80, or combustor 30) may be designed with two valves and a pipe whereby tramp removal may be effected during operation. The design of such a lock hopper allowing for online removal of heat transfer material from the dead zone may desirably eliminate the need for shutdown during tramp removal. As indicated, such a tramp removal system may also be utilized on the combustor, the CSP, the GSP, or any combination of vessels, whereby materials may be removed therefrom without taking the system(s) offline.

Gasifier Cyclones.

The herein disclosed DFB system comprises one or more gas/solid separator (e.g., one or more cyclone) on the gasifier outlet line 114. The system may comprise primary gasifier particulate separator(s) 40 and secondary gasifier particulate separator(s) 50 (e.g., primary and secondary gasifier cyclones). Particulate-reduced gasification product gas extracted from primary gasifier particulate separator 40 may be introduced into secondary gasifier particulate separator 50 via line 114*a*. Solids (e.g. char, unreacted carbonaceous material, and/or HTM) extracted from the gasification product gas via primary gasifier particulate separator 40 may be introduced into combustor seal pot 70, for example, via dipleg 41. Particulate-reduced gasification product gas extracted from secondary gasifier particulate separator 50 may be introduced into downstream apparatus 100 via line 114*b*. Solids (e.g. char, unreacted carbonaceous material, and/or HTM) extracted from the gasification product gas via secondary gasifier particulate separator 50 may be introduced into combustor seal pot 70, for example, via dipleg 51.

In embodiments, the gasifier separators are operable/configured to provide a HTM removal efficiency of at least or about 98, 99, 99.9, or 99.99%. In embodiments, the primary gasifier separators 40 are operable to remove at least or about 99.99% of the heat transfer material from a gas introduced thereto. Higher removal of heat transfer material is generally desirable, as the cost of makeup particulate heat transfer material and the cost of heating same to operation temperature are considerable. The secondary gasifier particulate separator(s) 50 (e.g., cyclones) may be configured to remove at least about 80, 85, 90 or 95% of the char (and/or ash) in the gasifier product gas introduced thereto via line 114*a*. In embodiments, the secondary gasifier separators are operable to remove at least about 95% of the ash and/or char introduced thereto. There may be some (desirably minimal) amount of recycle ash. As noted hereinabove, solids extracted via the primary gasifier separator(s) 40 and/or secondary gasifier particulate separator(s) 50 may be introduced into combustor seal pot 70 via diplegs 41 and 51 respectively. The exit from the gasifier to the gasifier primary cyclones may comprise a 90 degree flange.

Syngas Heat Recovery.

The product synthesis gas exiting the gasifier separators may be utilized for heat recovery in certain embodiments. In embodiments, the synthesis gas is not utilized for heat recovery. In embodiments, no heat recovery is incorporated on the syngas and the DFB gasification system further comprises a POx unit, a nickel dual fluidized bed gasifier and/or a boiler downstream of the gasifier separator(s). It is envisaged that heat recovery apparatus may be positioned between primary and secondary separators. When utilized for heat recovery, the temperature of the synthesis gas may be maintained at a temperature of at least 600° F., at least 650° F., at least 700° F., at least 750° F. or at least 800° F. after heat recovery. For example, maintenance of a temperature of greater than 650° F., 700° F., 750° F., 800° F., 850° F., or 900° F. may be desirable when heat recovery is upstream of tar removal (for example, to prevent condensation of tars). In embodiments, the synthesis gas is maintained at a temperature in the range of from about 650° F. to about 800° F. during heat recovery. In embodiments, the system comprises a steam superheater and optionally there-following a waste heat boiler or waste heat superheater downstream of the gasifier separators for heat recovery from the hot gasification gas comprising syngas and production of steam. In embodiments, the system comprises an air preheater for heat recovery from the hot synthesis gas. In embodiments, the system comprises a boiler feedwater (BFW) preheater for heat recovery from the hot synthesis gas. The system may comprise an air preheater (for example, to preheat air for introduction into the combustor, as the introduction of hotter air into the combustor may be desirable). The system may comprise any other suitable apparatus known to those of skill in the art for heat recovery.

Combustor/CSP.

The system comprises a combustor configured to heat the heat transfer material separated via one or more separators (e.g., cyclones) from the gasification product comprising entrained materials extracted from the pyrolyzer. The combustor may be any type of combustor known in the art, such as, but without limitation, fluidized, entrained, and/or non-fluidized combustors. 'Cold' circulation line 25 is configured to introduce 'cold' HTM into combustor 30, while 'hot' circulation line 35 is configured to introduce 'hot' HTM into gasifier 20.

Referring now to FIG. 1, combustor 30 is associated with a combustor seal pot 70 (CSP) configured to prevent backflow of materials into the gasifier cyclone(s) 40, 50; and one or more combustor cyclones 60 configured to remove particulates from the combustor flue gas.

In embodiments, air is fed into the bottom of combustor 30 (e.g. via line 121) and steam is fed into CSP 70. The steam feed rate may be about 4000 lb/h (for a plant operating at about 500 dry tons/day, for example). The steam passes through and exits combustor cyclone 60. The cyclone efficiency is dramatically affected by the superficial velocity thereto. The higher the superficial velocity, the better the cyclone efficiency. If the ACFM (actual cubic feet per minute) can be reduced, the cyclone efficiency may be improved (based on more solids per cubic foot). Thus, in embodiments, air is fed into CSP 70, rather than steam. In embodiments, 20-25% of the fluidization gas (e.g., air) for combustor 30 is introduced into or via CSP 70, for example, via line 141*b*, and/or into circulation line 25, for example via line 141*c*. In embodiments, combustion air, rather than steam, is fed into CSP 70, such that heat is not removed from combustor 30 due to the flow of steam therethrough and the downstream combustor separator(s)/cyclone(s) 60 and/or the downstream gasifier 20 may be incrementally smaller in size. That is, the introduction of air (e.g., at about 1000° F.), rather than the introduction of (e.g., 550° F.) steam into CSP 70 (which is heated therein to, for example, about 1800° F.) may serve to reduce the amount of steam in gasification system 10. This may allow the downstream vessel(s) to be smaller. When air is introduced into CSP 70, partial combustion of char may occur in the seal pot with air (rather than steam) and the downstream combustor cyclone 60 and/or gasifier 20 may be smaller. Accordingly, in embodiments the combustor is reduced in size by introduction of a portion of the combustor fluidization gas into CSP 70. For example, if the desired fluidization velocity at the top (e.g., proximate the flue gas exit) of the combustor is 30-35 ft/s, only about 75-80% (i.e. about 20 feet/s) may need to be introduced into the bottom of the combustor because 20-25% of the fluidization gas may be introduced into or via the CSP. Thus, the combustor size may be reduced. Another benefit of introducing combustor fluidization gas via the CSP is that the combustor cyclone(s) can be incrementally smaller or be operated more efficiently. Also, nitrogen in the air can be heated and thermal efficiency gained by eliminating or reducing the need for superheating steam (e.g., at 4000 lb/h of steam).

In embodiments, the fluidization gas for one or more of the gasifier 20, the gasifier seal pot 80, the combustor seal pot 70, and the combustor 30 comprises LP fuel gas. The fluidization gas in combustor 30 may comprise primarily air. The gas feed rate to the combustor may be greater than, less than, or about 10, 15, 20, 25, 30, or 35 feet/s in certain embodiments.

The slope from combustor seal pot 70 into combustor 30 provides angle α, such that the heat transfer media (e.g., sand), air and flue gas will flow over and back into the combustor. The inlet flow of fluidization gas into the combustor may be determined by the heat transfer material. The inlet fluidization velocity is at least that amount sufficient to fluidize the heat transfer media within combustor 30. In embodiments, the inlet velocity to the combustor is greater than or about 10, 15, 20, 25, or 30 ft/s. In embodiments, the inlet velocity of fluidization gas into the bottom of the combustor is in the range of from about 15 to about 35 ft/s, from about 20 to about 35 ft/s, or from about 20 to about 30 ft/s. At higher elevations in the combustor, flue gas is created. This limits the suitable rate for introduction of fluidization gas into the combustor.

In embodiments, the combustor is operated in entrained flow mode. In embodiments, the combustor is operated in transport bed mode. In embodiments, the combustor is operated in choke flow mode. The bottom of the combustor (for example, at or near the inlet of circulating heat transfer media from the gasifier) may be operated at approximately 1100° F., 1200° F., 1300° F., or 1400° F., and the exit of the combustor (at or near the top thereof; for example, at or near the exit of materials to cyclone(s)) may be operated at approximately 1400° F., 1500° F., or 1600° F. Thus, the actual cubic feet of gas present increases with elevation in the combustor (due to combustion of the char and/or supplemental fuel). In embodiments, excess air flow is returned to the combustor.

The fluidization gas for the combustor may be or may comprise oxygen in air, oxygen-enriched air, substantially pure oxygen, for example, from a vacuum swing adsorption unit (VSA) or a pressure swing adsorption unit (PSA), oxygen from a cryogenic distillation unit, oxygen from a pipeline, or a combination thereof. The use of oxygen or oxygen-enriched air may allow for a reduction in vessel size, however, the ash fusion temperature must be considered. The higher the $O_2$ concentration in the combustor feed, the higher the temperature of combustion. The oxygen concentration is kept at a value which maintains a combustion temperature less than the ash fusion temperature of the feed. Thus, the maximum oxygen concentration fed into the combustor can be selected by determining the ash fusion temperature of the specific feed utilized. In embodiments, the fluidization gas fed to the bottom of the combustor comprises from about 20 to about 100 mole percent oxygen. In embodiments, the fluidization gas comprises about 20 mole percent oxygen (e.g., air). In embodiments, the fluidization gas comprises substantially pure oxygen (limited by the ash fusion properties of the char, supplemental fuel and heat transfer material fed thereto). In embodiments, the combustor fluidization gas comprises PSA tailgas.

The combustor may be designed for operation with about 10 volume percent excess oxygen in the combustion offgas. In embodiments, the combustor is operable with excess oxygen in the range of from about 0 to about 20 volume percent, from about 1 to about 14 volume percent, or from about 2 to about 10 volume percent excess $O_2$. In embodiments, the amount of excess $O_2$ fed to the combustor is greater than 1 volume percent and/or less than 14 volume percent. Desirably, enough excess air is provided that partial oxidation mode is avoided. In embodiments, the DFB gasification system is operable with excess $O_2$ to the combustor in the range of greater than 1 to less than 10 and the flue gas comprises less than 15, 10, or 7 ppm CO. In embodiments, oxygen is utilized to produce more steam. In embodiments, for example, when the hot flue gas will be introduced into a second combustor (for example, without limitation, into the combustor of a second dual fluidized bed (DFB) gasifier as disclosed, for example, in U.S. patent application Ser. No. 12/691,297 filed Jan. 21, 2010, now U.S. Pat. No. 8,241,523, the disclosure of which is hereby incorporated herein for all purposes not contrary to this disclosure), the amount of excess oxygen may be in the range of from about 5 to about 25 percent, or may be greater than about 5, 10, 15, 20, or 25%, providing oxygen for a downstream combustor. In embodiments in which steam may be sold at value, more excess $O_2$ may be utilized to produce more steam for sale/use. In embodiments, a CO-rich, nitrogen-rich flue gas is produced by operation of combustor 30 of the herein disclosed DFB gasification system at excess oxygen of greater than 7, 10 or 15%.

Supplemental Fuels to the Combustor.

In embodiments, supplemental fuels may be introduced into combustor 30, for example, via supplemental fuel inlet line 122. The supplemental fuels may be carbonaceous or non-carbonaceous waste streams and may be gaseous, liquid, and/or solid. For example, in embodiments, spent Fischer-Tropsch wax (which may contain up to about 5, 10, 15, 20, 25, or 30 weight percent catalyst) may be introduced into the combustor (and/or the gasifier, as discussed further hereinbelow). In embodiments, Fischer-Tropsch wax is produced downstream and spent Fischer-Tropsch wax is recycled as fuel to the combustor. As discussed further hereinbelow, such spent wax can alternatively or additionally also be introduced into the gasifier, providing that it will crack under the operating conditions therein. In embodiments, petcoke is fed to the combustor, as a fuel source.

In embodiments, a hydrocarbon laden stream (e.g., tar that may result from a tar removal system) is introduced into the combustor for recovery of the heating value thereof. The tar may be obtained from any tar removal apparatus known in the art, for example from a liquid absorber such as but not limited to an OLGA (e.g., a Dahlman OLGA) unit. Such removed tars comprise heavy hydrocarbons which may be reused as a component of feed/fuel to combustor 30. In embodiments, tailgas (e.g., Fischer-Tropsch tailgas, PSA tailgas, VSA tailgas and/or upgrader tailgas) is utilized as a fuel to the combustor.

In embodiments, a liquid feed such as, but not limited to, refinery tank bottoms, heavy fuel oil, liquid fuel oil (LFO), Fischer-Tropsch tar and/or another material (e.g., waste material) having a heating value, is introduced into the combustor. Nozzles may be positioned above the dipleg for introduction of such liquid material(s) into the combustor. This may help the liquid flow into the downleg and avoid production of cold spots on the refractory. In this manner, circulating heat transfer material may be utilized to circulate the liquid and the liquid may be carried into the combustor via the combustor fluidization gas (e.g., air).

Combustor 30 may be fabricated with a 2-4 inch thick hard face refractory. In embodiments, the combustor has at least 2" hard face. In embodiments, combustor 30 has at least 3" hard face. In embodiments (e.g., in lower insulation embodiments), the combustor may comprise a hard face refractory with an insulating layer surrounding the hard face. The insulating layer may be thicker than 2 inches. In embodiments, the insulation layer is thicker than the hardface layer. The hardface layer may have a higher thermal conductivity and durability than the insulating layer.

In embodiments, the combustor is substantially cylindrical. In embodiments, the combustor is non-cylindrical. In embodiments, the combustor is conical at the bottom and/or the top. In embodiments, the combustor is conical at the bottom, for example, when the fluidization gas for the combustor comprises a high concentration of oxygen. In embodiments, the combustor comprises a conical disengaging section at the top (however, this embodiment may undesirably reduce the superficial velocity into downstream combustor gas/solid separator(s)). In embodiments, the outlet of the combustor comprises channels configured for recycle of heat transfer material to the fluidized bed of the combustor and to reduce particulate loading in primary separator(s). In embodiments, the outlet of the combustor is corrugated to reduce particulate loading on primary cyclone(s).

In embodiments, the combustor is pressurized. The combustor may be operable at a pressure of greater than 0 psig to a pressure that is at least 2 psig less than the operating pressure of the gasifier. That is, in order to maintain continuous flow of materials from the combustor back into the gasifier, the pressure of the combustor, $P_C$, at the inlet to the combustor which may be measured by a pressure gauge located proximate the flue gas exit, is less than the gasifier/pyrolyzer pressure, $P_G$. The pressure at the HTM outlet of the combustor, $P_{C,BOTTOM}$ (which must be greater than $P_G$), equals the sum of the pressure, $P_C$, at the top of the combustor and the head of pressure provided by the material in the combustor. The head of pressure provided by the heat transfer material/gas mixture within the combustor is equal to $\rho_C gh$, where $\rho_C$ is the average density of the material (e.g., the fluidized bed of heat transfer material) within the combustor, g is the gravitational acceleration, and h is the height of the 'bed' of material within the combustor. The height of material (e.g., heat transfer material such as sand, and other components such as char and etc.) within the combustor is adjusted to ensure flow of materials back to the gasifier.

Thus, $P_{C,BOTTOM}$ which equals $P_C + \rho_C g \Delta h$ must be greater than the pressure of the gasifier, $P_G$. The heights and relationships between the combustor and gasifier are selected such that adequate pressure is provided to maintain continuous flow from the combustor to the gasifier and back.

In embodiments, the operating pressure of the combustor, $P_C$, is up to or about 40, 45, or 50 psig. In embodiments, based on 30-40 ft/s design criteria for gas velocity into the combustor, the maximum operating pressure of the combustor is about 45 psig. In embodiments, if the operating pressure of the combustor is increased, then the pressure energy can be recovered by the use of an expander. Thus, in embodiments, one or more expander is positioned downstream of the combustor gas outlet and upstream of heat recovery apparatus (discussed further hereinbelow). For example, when operated with pure oxygen, the diameter of the combustor may be smaller at the bottom than the top thereof. In embodiments, an expander is incorporated after the cyclones (because cyclone efficiency increases with higher pressures). In embodiments, one or more expander is positioned upstream of one or more baghouse filters, which may be desirably operated at lower pressures. In embodiments, the system comprises an expander downstream of one or more combustor cyclones. The expander may be operable at a pressure greater than 15, 20 or 30 psig. The one or more expanders may be operable to recover PV energy.

Combustion Separator(s)/Heat Recovery:

The superficial velocity selected for the gas/solid separators (which may be cyclones) will be selected to maximize efficiency and/or reduce erosion thereof. The cyclones may be operable at a superficial velocity in the range of from about 65 to about 85 feet/s, from about 70 to about 85 feet/s, or at about 65, 70, 75, 80, or 85 ft/s.

As shown in FIG. 1, the combustor outlet may be fluidly connected, via combustor outlet line 106, with one or more combustor particulate separators 60 (e.g. HTM cyclones). Flue gas is extracted from combustor separator(s) 60 via particulate-reduced flue gas line 112, while separated solids (e.g. HTM) are introduced into GSP 80, for example via dipleg 61. The one or more cyclones may be configured in any arrangement, with any number of cyclones in series and/or in parallel. For example, a first bank of cyclones (e.g., from 1 to four or more cyclones) operated in parallel may be in series with a second bank of cyclones comprising from 1 to 4 or more cyclones in parallel and so on. The system can comprise any number of banks of cyclones.

The one or more combustion HTM cyclones may be connected with one or more ash cyclones, and the ash cyclones may be followed by heat recovery. In such embodiments, the cyclones are high temperature, refractory-lined or exotic material cyclones. In embodiments, the DFB gasification system comprises two, three or four combustor separators in series. In embodiments, one to two banks of combustion HTM cyclones are followed by one or more banks of ash cyclones. In embodiments, two combustion HTM cyclones are followed by one or more than one combustor ash cyclone. The one or more HTM cyclone may have a performance specification of greater than 99, greater than 99.9 or greater than 99.98% removal of heat transfer material (two or more combustor cyclones may be utilized to achieve the desired efficiency). In embodiments, the one or more ash cyclone may be operated to remove ash, for example, in order to reduce the size of a downstream baghouse(s). In embodiments, the one or more ash cyclones are operable to provide greater than about 60%, 70%, 80%, 85% or 90% ash removal from a gas introduced thereto.

In alternative embodiments, heat recovery apparatus is positioned between the HTM cyclone(s) and the ash removal cyclone(s). In such embodiments, combustor flue gas is introduced into one or more combustor HTM cyclones. The gas exiting the one or more HTM cyclones is introduced into one or more heat recovery apparatus. The gas exiting the one or more heat recovery apparatus is then introduced into one or more ash cyclones for removal of ash therefrom. The heat recovery apparatus may comprise one or more selected from the group consisting of air preheaters (e.g., a combustion air preheater), steam superheaters, waste heat recovery units (e.g., boilers), and economizers. In embodiments, heat recovery generates steam. In such embodiments comprising heat recovery upstream of ash removal, the one or more ash removal cyclones may not be refractory-lined, i.e. the one or more ash removal cyclones may be hard faced, but lower temperature cyclone(s) relative to systems comprising ash removal upstream of heat recovery. In embodiments, the ash removal cyclones are operable at temperatures of less than 400° F., less than 350° F., or less than 300° F. In embodiments, the lower temperature ash removal cyclones are fabricated of silicon carbide.

In embodiments, heat recovery is utilized to produce superheated steam. In embodiments, the superheated steam is produced at a temperature in the range of from about 250° F. to about 400° F. and a pressure in the range of from about 100 psig to about 300 psig.

In embodiments comprising heat recovery upstream of ash recovery, the face of the tubes may be built up and/or the velocity reduced in downward flow in order to minimize erosion of heat recovery apparatus (e.g., heat transfer tubes). The velocity to the cyclones in such embodiments may be less than 80, 75, 70, or 65 ft/s. If the velocity is reduced appropriately, the ash will not stick to the heat recovery apparatus (e.g., to waste heat boiler tubes and/or the superheater tubes), and will not unacceptably erode same.

In embodiments, combustor flue gas is introduced directly or indirectly to the economizer of a boiler for recovery of heat and, for example, power production.

In embodiments, the DFB system comprises one or more disengaging box. Such a disengaging box may be utilized in place of or in addition to the combustor cyclone(s) and/or the gasifier cyclones(s). Such a disengaging box may comprise a plurality of channels. Such a disengaging box may be more desirable on the process gas (gasifier/pyrolyzer) side to further ensure that HTM is effectively removed from the gasification process gas.

Gasifier Seal Pot (GSP) and Combustor Seal Pot (CSP).

Referring now to FIG. 1, the angle $\alpha/\gamma$ between the seal pot and the vessel (i.e. between the combustor seal pot and the combustor ($\alpha$) and/or between the gasifier seal pot and the gasifier ($\gamma$)) may be in the range of from about 5 to about 90°, from about 5 to about 80°, or from about 5 to about 60°. In embodiments, $\alpha/\gamma$ is less than 45°. Utilization of a higher angle generally mandates a taller seal pot. Lower angles may be operable with the use of fluidization/aeration to maintain fluidization. Generally, for $\alpha/\gamma$ angles between 5 and about 45 degrees, fluidization/aeration may also be utilized. In embodiments, a lower angle, such as an angle of about 5 degrees, is utilized in the design so that the seal pot (CSP and/or GSP) is relatively short and the overall height of the unit (i.e. the stackup) may be reduced.

As mentioned hereinabove, the seal pot fluidization gas can be or comprise another gas in addition to or in place of steam. For example, combustor flue gas and/or recycled synthesis gas may be utilized as fluidization gas for the GSP. In embodiments, the fluidization gas for the CSP, the GSP or both comprises steam. When recycled synthesis gas is utilized for fluidization of the GSP, the synthesis gas is returned to the gasifier and may provide additional clean synthesis gas from the DFB system. By using non-steam as the fluidization gas in the seal pot(s), steam may be reduced or substantially eliminated from the product gas, thus increasing the Wobbe Number thereof, which may be beneficial for downstream processes (such as, for example, downstream power production, discussed further hereinbelow). In embodiments, upgrader tailgas comprising sulfur is utilized as fluidization gas for the GSP.

Removal of Sulfur Compounds from Product Gasification Synthesis Gas Via Utilization of Wood Ash.

Sulfur may exit the disclosed DFB gasification system with the process gas, the combustor flue gas, and/or with the ash. Removal of the sulfur as a solid may be desired. In embodiments, ash (e.g., wood ash) from the ash removal cyclones is utilized to remove mercaptan sulfur and/or $H_{2S}$ from synthesis gas. In embodiments, mercaptan sulfur and/or $H_{2S}$ removal is performed at a pH of greater than or about 7.5, 7.7, or 8. In embodiments, the ash (e.g., wood ash) comprises, for example, NaOH and/or $Ca(OH)_2$. In embodiments, a sulfur extraction material is added with the heat transfer material, such that sulfur may be removed with ash. The sulfur extraction material may comprise a calcium material, such as calcium oxide (CaO), which may be converted to calcium sulfide and exit the system as a solid. In embodiments, ash water (comprising NaOH and/or $Ca(OH)_2$) is utilized to scrub sulfur from the outlet gases. For example, the system may comprise a scrubbing tower for cleaning the process gas. Depending on the basicity of the ash water, it may be utilized, in embodiments, as scrubbing water. Such scrubbing may be performed upstream of an ESP or other particulate separator configured to remove particulates.

Except for air, the different fluidization gases mentioned for the CSP may be utilized for the GSP as well. (In embodiments, a percentage of air (e.g., less than 4 volume percent) may be utilized on the GSP to provide higher temperature in the gasifier). The fluidization gas on the GSP may be selected from the group consisting of flue gas, steam, recycled synthesis gas, and combinations thereof.

In embodiments, the seal pots are round. In embodiments, the seal pots are rectangular. In embodiments, the seal pots are square. In embodiments, the operating pressure is less than about 15 psig and the seal pots are not round. The use of square and/or rectangular seal pot designs may allow for closer spacing therebetween.

For the GSP, the minimum fluidization velocity for the heat transfer material is set at any point in time. That is, the minimum initial fluidization velocity is determined by the initial average particle size (e.g., 100 μm). After a time on stream (for example, 120 days), the heat transfer material may have a reduced average particle size (e.g., about 25 μm); thus the minimum fluidization velocity changes (decreasing with time on stream/HTM size reduction). The CSP and GSP may be selected such that they have a size suitable to handle the highest anticipated fluidization velocity, i.e. generally the start-up value. In embodiments, the minimum fluidization velocity of the GSP is initially high and decreases with time. However, it is possible that, if agglomerization occurs, the minimum fluidization velocity may increase. The minimum fluidization velocity is determined by the heat transfer material, in particular by the average particle size, the density, and/or the void fraction thereof. In embodiments, the minimum fluidization velocity is greater than about 0.2 ft/s. In embodiments, the minimum fluidization velocity is greater than about 1.5 ft/s. As the particle size distribution (PSD) decreases, seal pot fluidization velocity decreases.

The diameter of the seal pots may be set by the number of dipleg penetrations, i.e. how many cyclones and/or by the angles at which the diplegs enter into the seal pot. Diplegs may be angled to allow shorter dipleg length. In embodiments, combustor cyclone diplegs enter the top of the gasifier seal pots, as with the CSP (where gasifier cyclone diplegs enter the CSP). The CSP and/or the GSP may contain a distributor configured for distributing gas uniformly across the cross-section (e.g., the diameter) thereof. In embodiments, the distributor is positioned at or near the bottom of the CSP and/or the GSP. In embodiments, to minimize/avoid erosion of the seal leg, the minimum distance between the distributor (i.e. the fluidization nozzles) at the bottom of the seal pot (GSP and/or CSP) and the bottom of the dipleg(s) projecting thereinto is 10, 11, 12, 13, 14, 15, 16, 17 or 18 inches. In embodiments, there is a distance of more than 15, 16, 17 or 18 inches between the seal pot distributor and the cyclone dipleg(s). Desirably, the dipleg-to-dipleg spacing and/or the dipleg-to-refractory ID spacing is at least 10, 11 or 12 inches. In embodiments, the dipleg-to-dipleg spacing and the dipleg-to-refractory ID spacing is at least about 12 inches. In embodiments, the diplegs are supported. Such support may be provided to minimize/prevent vibration of the diplegs. For the GSP, the seal may actually be within the dipleg of the combustor cyclone(s) and the GSP (since gasifier 20 is at a higher pressure than combustor separator 60).

The GSP is designed with an adequate head of heat transfer material to minimize backflow. The height of the GSP is based on a design margin. In embodiments, the design margin is in the range of from about 1 psig to about 5 psig, or is greater than or about equal to 1, 2, 3, 4, or 5 psig. The head of heat transfer material (e.g., sand) will provide the ΔP (pressure drop) at least sufficient to prevent backflow of gas/prevent gasifier backflowing into the combustor cyclone. The distribution of nozzles in both the CSP and the GSP may be in the range of from about one to about four nozzles per square foot. In embodiments, the distributors in any or all vessels (gasifier, combustor, CSP and GSP) comprise from about one to about four nozzles per ft².

In embodiments, one or more of the seal pots (either or both a combustor seal pot, CSP, and/or a gasifier seal pot, GSP) is replaced with an L valve or a J valve. In embodiments, the disclosed DFB gasification system comprises one or more J valves in place of a CSP. In embodiments, the DFB gasification system comprises one or more J valves in place of a GSP. In embodiments, the DFB gasification system comprises multiple CSPs. In embodiments, the multiple CSPs are substantially identical. In embodiments, the DFB gasification system comprises multiple GSPs. In embodiments, the multiple GSPs are substantially identical. In embodiments, the disclosed gasification system comprises at least one or one CSP and at least one or one GSP. The seal of the CSP may be within the CSP (while the seal on the GSP may simply be within a dipleg). In embodiments, a J valve is utilized on the gasifier rather than a GSP.

The height of the CSP is determined by the pressure needed for the seal, which is the differential pressure between the gasifier cyclone and the combustor. The combustor pressure plus a design margin may be utilized to determine the desired height of the CSP (i.e. the desired height of the heat transfer material therein). In embodiments, the pressure is near atmospheric. In embodiments, the ΔP is greater than 2 psig. In embodiments, the ΔP is in the range of from about 2 psig to about 25 psig, from about 2 psig to about 20 psig, or from about 2 psig to about 15 psig. In embodiments, the pressure differential is about 10, 12, 15, or 20 psig. Desirably, the ΔP is not less than about 2 psig, as pressure equalization is undesirable. In embodiments, a smaller ΔP is utilized, thus allowing the use of a shorter CSP 70.

Downstream Systems.

The DFB gasification system may further comprise apparatus 100 downstream of the dual fluidized bed gasifier. For example, downstream apparatus 100 may include one or more selected from Fischer-Tropsch synthesis apparatus, power production apparatus, non-Fischer-Tropsch chemical production apparatus, tar removal apparatus, heat recovery apparatus, carbon dioxide removal apparatus, scrubbers, expanders, and combinations thereof. In FIG. 1, line 117 indicates generically the removal of product and/or byproduct (e.g. tar, tar-reduced gas, FT synthesis products, FT tailgas, PU tailgas, scrubbed gas, power, upgraded product, chemicals, fuels, carbon dioxide, carbon-dioxide reduced gas, etc.) from downstream apparatus 100.

In embodiments, the DFB gasification system is integrated into a biomass to fuels and/or biomass to power system. In embodiments, both power and Fischer-Tropsch fuels are produced from the gaseous products of the disclosed DFB gasifier. In embodiments, the DFB gasification system is integrated with power production apparatus, whereby the system is utilized for (e.g., primarily for) the production of power. In embodiments, the system is integrated with Fischer-Tropsch synthesis apparatus and used utilized primarily for the production of liquid fuels (e.g., Fischer-Tropsch fuels).

Figure 2:
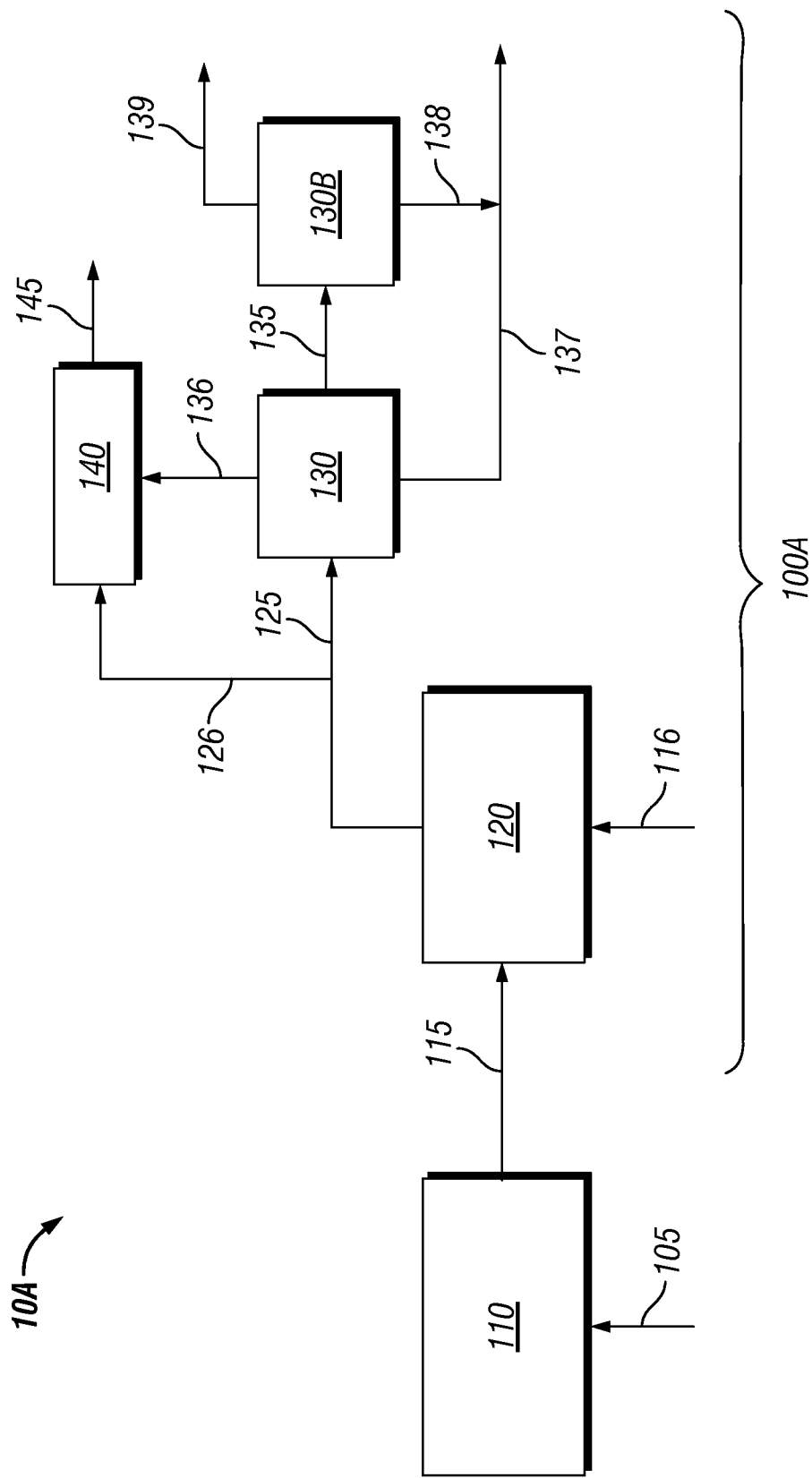
FIG. 2 is a schematic of an integrated system comprising a gasification system according to this disclosure integrated with Fischer-Tropsch synthesis and power production.

In embodiments, from about 10 to about 30% of the product synthesis gas from a DFB as disclosed herein is bypassed to power generation and at least a portion of the remaining product gas is utilized for the production of Fischer-Tropsch fuels. In such embodiments, at least a portion of the Fischer-Tropsch tailgas from the production of Fischer-Tropsch fuels may be blended with the bypass synthesis gas to provide a gas with a suitable Wobbe number for the production of power. FIG. 2 is a schematic of an integrated system 10A comprising a dual fluidized bed gasification system/'gasifier' 110 according to this disclosure, and downstream apparatus 100A configured for Fischer-Tropsch synthesis and power production. Gasification system 110 is as described with regard to gasification system 10 in FIG. 1. Integrated system 10A comprises DFB gasifier 110, power production apparatus 140, and Fischer-Tropsch synthesis apparatus 130. Carbonaceous feed introduced via line 105 is gasified in the DFB gasifier 110, as described hereinabove, producing 'dirty' synthesis gas extracted from DFB gasifier 110 via line 115. Integrated system 10A may comprise apparatus 120 configured for cleaning up the 'dirty' synthesis gas to provide a synthesis gas having fewer undesirable components (i.e. having reduced amounts of hydrogen, carbon monoxide, carbon dioxide, water vapor, hydrogen sulfide, and/or etc.) and/or a desired molar ratio of hydrogen to carbon monoxide. For example, apparatus 120 may comprise a partial oxidation apparatus fluidly connected via line 115 with the DFB gasifier 110, and configured to subject the 'dirty' synthesis gas to oxidation, producing a 'clean' synthesis gas. A POx reactor may be operable at a temperature of greater than or about 2000° F., 2100° F., or 2200° F. Oxygen may be introduced into the apparatus 120 (e.g. a POx reactor) via line 116. A line 125 may be configured to introduce at least portion of the 'cleaned' synthesis gas from clean-up apparatus 120 into, for example, a Fischer-Tropsch production reactor of FT synthesis apparatus 130. A line 126 may be configured to introduce at least a portion of the synthesis gas into power production apparatus 140, configured for the production of power.

The Fischer-Tropsch synthesis reactor 130 may be any suitable Fischer-Tropsch reactor known in the art. In embodiments, the Fischer-Tropsch synthesis reactor comprises an iron-based catalyst. In embodiments, the Fischer-Tropsch synthesis reactor comprises a cobalt-based catalyst. In embodiments, the catalyst is a precipitated iron catalyst. In embodiments, the precipitated Fischer-Tropsch catalyst is an iron-based catalyst formed as described in or having the composition of Fischer-Tropsch catalyst described in U.S. Pat. No. 5,504,118 and/or U.S. patent application Ser. No. 12/189,424 (now U.S. Pat. No. 7,879,756); Ser. Nos. 12/198,459; 12/207,859; 12/474,552; and/or 12/790,101 (now U.S. Pat. No. 8,791,041), the disclosure of each of which is hereby incorporated herein in its entirety for all purposes not contrary to this disclosure.

Fischer-Tropsch production reactor 130 produces Fischer-Tropsch tailgas and a variety of products that are generally liquids at the operating temperature of the Fischer-Tropsch reactor. The liquid Fischer-Tropsch products may comprise primarily hydrocarbons. The liquid Fischer-Tropsch products may comprise primarily long-chain aliphatic hydrocarbons. Tailgas may be removed from Fischer-Tropsch reactor 130 via a tailgas line 136 and Fischer-Tropsch synthesis products may be removed via line 137 and/or 135.

Integrated system 10A may further comprise product upgrading apparatus 130B configured to upgrade the liquid products of the Fischer-Tropsch synthesis and fluidly connected with Fischer-Tropsch synthesis apparatus 130 via line 135, whereby at least a portion of the liquid products of the Fischer-Tropsch reactor 130 may be upgraded to more desired products. The product upgrading apparatus 130B may comprise hydrotreating apparatus, hydrocracking apparatus, hydroisomerization apparatus, and/or any other product upgrading apparatus known to those of skill in the art. The products of Fischer-Tropsch reactor 130 and/or the product upgrading apparatus 130B removed via lines 137 and 138, respectively, may comprise primarily jet fuel, primarily diesel fuel, primarily gasoline, primarily naphtha, or some combination of one or more selected from jet fuel, diesel fuel, gasoline, and naphtha.

Upgrading may create an upgrader tailgas, removed from integrated system 10A via line 139. As discussed hereinabove, such upgrader tailgas may be utilized as fuel for the combustor of the DFB gasification system 110, and/or as fluidization gas in a CSP, a GSP, and/or the gasifier thereof. In such embodiments, upgrader tailgas outlet line 139 may fluidly connect product upgrader 130B with combustor 30, with CSP 70, with GSP 80, and/or with gasifier 20.

Power production apparatus 140 may be any apparatus known in the art for the production of power, indicated in FIG. 2 via line 145. In embodiments, power production apparatus 140 comprises a gas turbine. In embodiments, at least a portion of the tailgas removed from Fischer-Tropsch synthesis reactor 130 via line 136 is introduced into power production apparatus 140. In embodiments, a portion of the Fischer-Tropsch tailgas is utilized for power production and a portion is utilized in the DFB gasifier of gasification system 110, as discussed in detail hereinabove. For example, a portion of the Fischer-Tropsch tailgas may be utilized as fuel for the combustor of the DFB gasification system 10/110, and/or as fluidization gas in a CSP, a GSP, and/or the gasifier thereof. In such embodiments, FT tailgas outlet line 136 may be fluidly connected with combustor 30, with CSP 70, with GSP 80, and/or with gasifier 20.

In embodiments, a DFB gasification system of this disclosure further comprises a tar removal system downstream from the gasifier cyclones and configured for removal of tar from the product synthesis gas. In embodiments, the tar removal system is downstream heat recovery apparatus. The tar removal system may comprise a Dahlman unit, which comprises a multistage solvent (i.e. oil) wash. The Dahlman unit may be operable with synthesis gas at a temperature of at least or about 650° F., 700° F., 750° F., 800° F., 850° F., or 900° F. As discussed hereinabove, a portion of the removed tars may be recycled to the combustor of the DFB gasification system for use as fuel.

In embodiments, the DFB gasification system further comprises a POx unit, a boiler or a NiDFB (mentioned hereinabove) downstream of the gasifier. In embodiments, the synthesis gas is provided for downstream production of chemicals and the DFB gasification system further comprises downstream apparatus for the production of chemicals and/or fuels other than Fischer-Tropsch fuels and/or chemicals. The downstream apparatus may be any apparatus known in the art configured for the production of methanol, ethanol, ammonia, fertilizer, etc., from gasification gas comprising hydrogen and carbon monoxide.

In embodiments, a system for the production of jet fuel is provided, the system comprising a DFB gasifier as disclosed herein, tar reforming apparatus, one or more slurry Fischer-Tropsch reactors, hydrocracking apparatus and/or hydrotreating apparatus.

Features/Advantages:

The disclosed system and method enable the production of gas by use of a high throughput pyrolyzer and an external combustor, incorporating circulation of a heat transfer material to provide heat for the endothermic gasification reactions. Via the disclosed system and method, exothermic combustion reactions are separated from endothermic gasification reactions. The exothermic combustion reactions take place in or near a combustor while the endothermic gasification reactions take place in the gasifier/pyrolyzer. This separation of endothermic and exothermic processes may provide a high energy density product gas without the nitrogen dilution present in conventional air-blown gasification systems.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A system configured for the production of at least one product selected from the group consisting of synthesis gas, Fischer-Tropsch synthesis products, power, and chemicals, the system comprising:

a dual fluidized bed gasification apparatus comprising:
a gasifier and a combustor, wherein the combustor is configured for heating a particulate heat transfer material, thus producing a combustor flue gas; and wherein the gasifier is configured to receive the heated particulate heat transfer material and a carbonaceous feedstock, whereby the heated particulate heat transfer material provides heat for endothermic gasification of the carbonaceous feedstock, thus producing a gasification product gas comprising hydrogen and carbon monoxide;

a gasifier outlet line configured for extracting, from at or near a top of the gasifier, the gasification product gas comprising, entrained therein, char, particulate heat transfer material, and optionally unreacted carbonaceous feedstock, wherein the gasifier outlet line is the only outlet of the gasifier whereby particulate heat transfer material to be circulated between the combustor and the gasifier is extracted therefrom;

at least one combustor particulate separator configured to separate the heated particulate heat transfer material from the combustor flue gas, wherein the at least one combustor particulate separator is fluidly connected with the gasifier via a gasifier seal pot configured to prevent backflow of material from the gasifier into the at least one combustor particulate separator, wherein the gasifier comprises a heated heat transfer material inlet configured for the introduction of heated particulate heat transfer material thereto, said heated heat transfer material inlet located on a side wall of and at or near a bottom of the gasifier, and wherein the gasifier seal pot comprises a single outlet, said single outlet directly connected with the heated heat transfer material inlet of the gasifier via a heat transfer line, whereby all of the separated heated particulate heat transfer material extracted from the gasifier seal pot is introduced directly into the gasifier; and at least one apparatus selected from the group consisting of power production apparatus configured to produce power from at least a portion of the gasification product gas, partial oxidation reactors configured for oxidation of at least a portion of the gasification product gas, tar removal apparatus configured to reduce the amount of tar in the gasification product gas, Fischer-Tropsch synthesis apparatus configured to produce Fischer-Tropsch synthesis products from at least a portion of the gasification product gas, chemical production apparatus configured for the production of at least one non-Fischer-Tropsch product from at least a portion of the gasification product gas, and dual fluidized bed gasification units configured to alter the composition of at least a portion of the gasification product gas.

2. The system of claim 1 wherein the particulate heat transfer material is selected from the group consisting of sand, limestone, and other calcites or oxides including iron oxide, olivine, and magnesia, alumina, carbides, silica alumina, zeolites, and combinations thereof.

3. The system of claim 2 wherein the particulate heat transfer material further comprises a catalyst.

4. The system of claim 1 wherein the combustor is configured for operation with excess oxygen in the range of from about 0 to about 20 volume percent.

5. The system of claim 1 further comprising a carbonaceous material feed inlet fluidly connected with the gasifier, and configured for introduction of the carbonaceous feedstock into the gasifier.

6. The system of claim 5 wherein the angle formed between the carbonaceous material feed inlet and the gasifier is in the range of from about 5° to about 20°.

7. The system of claim 1 further comprising Fischer-Tropsch synthesis apparatus configured to produce Fischer-Tropsch synthesis wax from at least a portion of the gasification product gas, and wherein the system further comprises a recycle line fluidly connecting the Fischer-Tropsch synthesis apparatus with the gasifier, whereby the carbonaceous feedstock to the gasifier comprises Fischer-Tropsch synthesis wax.

8. The system of claim 1 wherein the gasifier is operable with carbonaceous feedstocks at any temperature in the range of from about −40° F. to about 260° F.

9. The system of claim 1 configured for introduction of a purge gas with the carbonaceous feedstock.

10. The system of claim 9 wherein the purge gas is selected from the group consisting of carbon dioxide, steam, fuel gas, nitrogen, synthesis gas, combustor flue gas, and combinations thereof.

11. The system of claim 10 further comprising apparatus for the removal of carbon dioxide from the combustor flue gas, the gasification product gas, or both; wherein the system further comprises one or more recycle lines fluidly connecting the carbon dioxide removal apparatus with a gasifier carbonaceous material feed inlet, whereby at least a portion of the removed carbon dioxide can be introduced into the gasifier as purge gas.

12. The system of claim 1 wherein the combustor is operable such that an operating temperature at or near an inlet thereto for heat transfer material is in the range of from about 1000° F. to about 1400° F., and an operating temperature at or near the exit thereof to the at least one combustor particulate separator is in the range of from about 1400° F. to about 1800° F.

13. The system of claim 1 further comprising a dryer upstream of the gasifier, wherein the dryer is configured to remove moisture from the carbonaceous feedstock prior to introduction thereof into the gasifier.

14. The system of claim 13 further comprising a line configured for introducing at least a portion of the combustor flue gas into the dryer, whereby hot combustor flue gas can be utilized to dry the carbonaceous feedstock.

15. The system of claim 1 wherein the gasifier is operable with a carbonaceous feedstock having a moisture content in the range of from about 10 to about 40 weight percent.

16. The system of claim 1 operable to convert at least about 30, 40, 50, 60, 70, or 80% of the carbon in the carbonaceous feedstock into gasification product gas.

17. The system of claim 1 wherein the gasifier is operable at a carbonaceous feedstock rate of at least 2000 lb/h-ft$^2$, 2400 lb/h-ft$^2$, 2500 lb/h-ft$^2$, 3000 lb/h-ft$^2$, 3400 lb/h-ft$^2$, or 4000 lb/h-ft$^2$.

18. The system of claim 1 wherein the gasifier is configured for fluidization with a gasifier fluidization gas having an inlet gasifier fluidization gas superficial velocity in the range of from about 0.5 ft/s to about 10 ft/s, an outlet superficial velocity of gasification product gas comprising entrained particulate heat transfer material in the range of from about 35 to about 50 ft/s, or both.

19. The system of claim 1 wherein the gasifier is operable at an operating temperature in the range of from about 1000° F. to about 1600° F.

20. The system of claim 1 wherein the gasifier is operable at an operating pressure of greater than about 2 psig, less than about 45 psig, or both.

21. The system of claim 1 wherein the combustor is configured for fluidization with a combustor fluidization gas having an inlet combustor fluidization gas superficial velocity in the range of from about 15 to about 25 ft/s, an outlet flue gas superficial velocity in the range of from about 25 to about 40 ft/s, or both.

22. The system of claim 1 wherein the gasifier comprises a gasifier distributor configured to introduce gasifier fluidization gas substantially uniformly across the diameter of the gasifier, wherein the combustor comprises a combustor distributor configured to introduce combustor fluidization gas substantially uniformly across the diameter of the combustor, or both.

23. The system of claim 22 wherein the combustor is configured to receive particulate heat transfer material at a location at least about 4, 5, or 6 inches above the combustor distributor; wherein the gasifier is configured to receive heated fluidized particulate heat transfer material at a location at least about 4, 5, or 6 inches above the gasifier distributor; or both.

24. The system of claim 1 operable to provide, from the combustor to the gasifier, heated fluidized particulate heat transfer material having a temperature in the range of from about 1400° F. to about 1600° F.

25. The system of claim 1 wherein the operating temperature differential between the gasifier and the combustor is less than about 300° F.

26. The system of claim 1 optionally comprising at least one combustor seal pot configured to prevent backflow of material from the combustor into at least one gasifier particulate separator, and wherein at least one component selected from the group consisting of the gasifier, the combustor, the at least one combustor seal pot, and the at least one gasifier seal pot is configured with a dead zone between a distributor and a bottom thereof, such that tramp removal may be performed during operation.

27. The system of claim 1 wherein the gasifier is configured to convert at least a portion of the carbonaceous feedstock to char and wherein the system is configured for transfer of the char out of the gasifier.

28. The system of claim 27 configured for transfer of at least a portion of the char to the combustor, wherein the combustor is configured to combust the char to provide at least a portion of the heat for heating the particulate heat transfer material.

29. The system of claim 28 wherein the combustor is configured for operation with substantially no fuel other than the char.

30. The system of claim 28 wherein the combustor is fluidly connected with downstream Fischer-Tropsch synthesis apparatus, wherein the Fischer-Tropsch synthesis apparatus provides Fischer-Tropsch wax and Fischer-Tropsch tailgas, and wherein the system further comprises a line fluidly connecting the Fischer-Tropsch synthesis apparatus and the combustor, whereby a supplemental fuel selected from the group consisting of the Fischer-Tropsch wax and the Fischer-Tropsch tailgas can be introduced into the combustor.

* * * * *